US012508191B2

(12) United States Patent
Ayu et al.

(10) Patent No.: US 12,508,191 B2
(45) Date of Patent: Dec. 30, 2025

(54) HIGH FREQUENCY CHEST WALL OSCILLATION AIR PULSE GENERATOR HAVING PRESSURE SENSOR FOR FEEDBACK CONTROL

(71) Applicant: HILL-ROM SERVICES PTE. LTD., Singapore (SG)

(72) Inventors: Aaron Alexander Ayu, Singapore (SG); Wei Bian, Singapore (SG); Yaolong Lou, Singapore (SG); Kok Boon R. Ong, Singapore (SG); Gee Han Png, Singapore (SG); Alvin Tan, Singapore (SG)

(73) Assignee: HILL-ROM SERVICES PTE. LTD., Singapore (SG)

( * ) Notice: Subject to any disclaimer, the term of this patent is extended or adjusted under 35 U.S.C. 154(b) by 670 days.

(21) Appl. No.: 17/949,431

(22) Filed: Sep. 21, 2022

(65) Prior Publication Data

US 2023/0116467 A1 Apr. 13, 2023

Related U.S. Application Data

(60) Provisional application No. 63/406,826, filed on Sep. 15, 2022, provisional application No. 63/255,143, filed on Oct. 13, 2021.

(51) Int. Cl.
*A61H 9/00* (2006.01)

(52) U.S. Cl.
CPC ......... *A61H 9/0071* (2013.01); *A61H 9/0078* (2013.01); *A61H 2201/0103* (2013.01); *A61H 2201/1238* (2013.01); *A61H 2201/165* (2013.01); *A61H 2205/08* (2013.01)

(58) Field of Classification Search
CPC .......... A61H 9/00–0007; A61H 9/0021; A61H 9/005; A61H 9/0078; A61H 9/0092; A61H 2201/0103; A61H 2201/1238–1246; A61H 2201/165; A61H 2205/08
See application file for complete search history.

(56) References Cited

U.S. PATENT DOCUMENTS

| | | | | |
|---|---|---|---|---|
| 4,501,280 | A | 2/1985 | Hood, Jr. | |
| 4,977,889 | A | 12/1990 | Budd | |
| 5,769,797 | A * | 6/1998 | Van Brunt | A61H 9/0078 601/44 |
| 6,736,785 | B1 | 5/2004 | Van Brunt | |

(Continued)

FOREIGN PATENT DOCUMENTS

| | | | |
|---|---|---|---|
| CN | 102423279 | A | 4/2012 |
| CN | 111420200 | A | 7/2020 |

(Continued)

*Primary Examiner* — Rachel T Sippel
(74) *Attorney, Agent, or Firm* — Barnes & Thornburg LLP

(57) ABSTRACT

A high frequency chest wall oscillation therapy system includes an air pulse generator. The air pulse generator includes control circuitry and a fluid chamber carrying a fluid. A motor is configured to generate compression and expansion of the fluid in the fluid chamber to generate pressurized fluid. A pressure sensor detects a pressure of the pressurized fluid in the fluid chamber. A garment includes at least one fluid bladder defining a pressurizable chamber adapted to receive the pressurized fluid from the fluid chamber to provide a force of high frequency pressure oscillation to a patient's chest wall.

18 Claims, 16 Drawing Sheets

(56) References Cited

U.S. PATENT DOCUMENTS

| | | | | |
|---|---|---|---|---|
| 6,958,046 | B2 | 10/2005 | Warwick et al. | |
| RE40,814 | E | 6/2009 | Van Brunt | |
| 8,235,922 | B2 | 8/2012 | Rowe et al. | |
| 8,708,937 | B2 | 4/2014 | Van Brunt et al. | |
| 8,734,370 | B1 | 5/2014 | Ignagni | |
| 9,237,982 | B2 | 1/2016 | Van Brunt | |
| 9,386,952 | B2 | 7/2016 | Younes | |
| 9,782,323 | B2 | 10/2017 | Perry et al. | |
| 9,788,738 | B2 | 10/2017 | Barak et al. | |
| 10,219,971 | B2 | 3/2019 | Denson et al. | |
| 10,300,239 | B2 | 5/2019 | Brand et al. | |
| 10,602,784 | B2 | 3/2020 | Mazzarolo et al. | |
| 10,667,984 | B2 | 6/2020 | Brosnan et al. | |
| 10,702,450 | B2 | 7/2020 | Zgoda et al. | |
| 10,905,837 | B2 | 2/2021 | Lacy et al. | |
| 11,110,028 | B2 | 9/2021 | Huster et al. | |
| 2004/0097842 | A1* | 5/2004 | Van Brunt | A61H 9/0078 601/44 |
| 2004/0260218 | A1* | 12/2004 | Shah | A61H 31/006 601/152 |
| 2005/0235988 | A1* | 10/2005 | Hansen | F04B 35/06 128/200.24 |
| 2007/0106186 | A1* | 5/2007 | Baek | A61H 9/0078 601/149 |
| 2007/0239087 | A1* | 10/2007 | Kivisto | A61H 31/006 601/44 |
| 2013/0289456 | A1 | 10/2013 | Chang Guo et al. | |
| 2014/0236058 | A1* | 8/2014 | Lee | A61H 9/0078 601/84 |
| 2015/0051518 | A1 | 2/2015 | Zhou et al. | |
| 2017/0007494 | A1 | 1/2017 | Rock et al. | |
| 2019/0000329 | A1 | 1/2019 | Denson et al. | |
| 2021/0137779 | A1 | 5/2021 | Chhua et al. | |

FOREIGN PATENT DOCUMENTS

| | | | |
|---|---|---|---|
| WO | 2020092701 | A2 | 5/2020 |
| WO | 2021214769 | A1 | 10/2021 |

* cited by examiner

HIGH FREQUENCY CHEST WALL OSCILLATION AIR PULSE GENERATOR HAVING PRESSURE SENSOR FOR FEEDBACK CONTROL

CROSS-REFERENCE TO RELATED APPLICATION

This application claims priority under 35 U.S.C. § 119(e) to U.S. Provisional Application No. 63/255,143, filed Oct. 13, 2021, and U.S. Provisional Application No. 63/406,826, filed Sep. 15, 2022, which are both expressly incorporated by reference herein.

BACKGROUND

The present disclosure relates to a high frequency chest wall oscillation (HFCWO) air pulse generator and, in particular, to a HFCWO air pulse generator having a pressure sensor for feedback control.

High-frequency chest wall oscillation (HFCWO) is performed using an inflatable garment that is attached to an air pulse generator through air hoses. The HFCWO system mechanically performs chest physical therapy by vibrating at a high frequency. This is done by rapid mechanical compression of air in an fluid chamber within the air pulse generator. The compressed air is transferred to the garment through the air hoses. The garment vibrates the chest to loosen and thin mucus. At a predetermined time, the patient stops the air pulse generator and coughs or huffs.

Respiration during therapy results in ribcage movements exerting pressure on the garment. For example, when breathing in, the ribcage expands, compressing the garment. When breathing out, the ribcage collapses and compression on garment is reduced. The rhythmic compression on the garment creates pressure fluctuation that is reflected in the fluid chamber of the air pulse generator. Following ideal gas Boyle's law, a change in the fluid volume in the garment due to ribcage compression against the garment raises the pressure in the fluid chamber.

HFCWO systems can be grouped into pneumatics and portable vibration motor types. Generally, HFCWO systems include an open loop system with the user determining the therapy intensity/frequency and duration. Currently, no garment type detection or garment diagnosis capabilities exist in HFCWO systems.

SUMMARY

The present disclosure includes one or more of the features recited in the appended claims and/or the following features which, alone or in any combination, may comprise patentable subject matter.

According to a first aspect of the disclosed embodiments, a high frequency chest wall oscillation therapy system includes an air pulse generator. The air pulse generator includes control circuitry and a fluid chamber carrying a fluid. A motor is configured to generate compression and expansion of the fluid in the fluid chamber to generate pressurized fluid. A pressure sensor detects a pressure of the pressurized fluid in the fluid chamber. The control circuitry generates a pressure waveform of the pressurized fluid based on the pressure detected. A garment is provided for dressing on a patient's torso. The garment includes at least one fluid bladder defining a pressurizable chamber adapted to receive the pressurized fluid from the fluid chamber to provide a force of high frequency pressure oscillation to a patient's chest wall.

In some embodiments of the first aspect, the pressure sensor may include a port positioned in the fluid chamber to detect the pressure of the pressurized fluid in the fluid chamber. The pressure sensor may include a first port positioned in the fluid chamber to detect the pressure of the pressurized fluid in the fluid chamber. A second port may be positioned outside of the fluid chamber to detect an atmospheric pressure. The detected pressure of the pressurized fluid in the fluid chamber may be compared to the detected atmospheric pressure to generate the pressure waveform. The fluid chamber may include a pair of pistons. A port of the pressure sensor may be centered between the pair of pistons in the fluid chamber. A hose may direct the pressurized fluid from the fluid chamber of the air pulse generator to the at least one fluid bladder of the garment.

Optionally, in the first aspect, the garment may produce a unique pressure waveform. The pressure waveform generated by the control circuitry from the pressure detected may be compared to the unique pressure waveform to identify the garment. The unique pressure waveform may include a unique minimum pressure and maximum pressure. The unique pressure waveform may include a unique peak to peak pressure value. The unique pressure waveform may include a unique air pulse generator inflation pressure. The pressure waveform generated by the control circuitry from the pressure detected may be compared to the unique pressure waveform to identify a size of the garment.

It may be desired, in the first aspect, that the pressure waveform generated by the control circuitry indicates pressure changes due to respiration of the patient. The pressure changes due to respiration of the patient may be caused by compression of the garment resulting in a change in fluid volume in the garment. The change in fluid volume in the garment may increase the pressure detected by the pressure sensor.

It may be contemplated, in the first aspect, that the pressure waveform generated by the control circuitry may be indicative of a breathing pattern of the patient. The control circuitry may store breathing pattern data indicative of the breathing pattern of the patient in a memory of the air pulse generator. A historical assessment of the breathing pattern data may be indicative of the patient's lung health. The breathing pattern data may be acquired without an electrical connection between the patient and the control circuitry. The control circuitry may perform a Fast Fourier Transform of the pressure waveform to determine the breathing pattern data.

According to a second aspect of the disclosed embodiments, a high frequency chest wall oscillation therapy system includes an air pulse generator. The air pulse generator includes control circuitry and a fluid chamber carrying a fluid. A motor is configured to operate a pair of pistons in the fluid chamber to compress and expand the fluid in the fluid chamber to generate pressurized fluid. A differential pressure sensor includes a first port centered between the pair of pistons within the fluid chamber to detect a pressure of the pressurized fluid in the fluid chamber. A second port is positioned outside of the fluid chamber to detect an atmospheric pressure. The control circuitry generates a pressure waveform of the pressurized fluid based on a comparison of the detected pressure of the pressurized fluid in the fluid chamber and the detected atmospheric pressure. A garment is provided for dressing on a patient's torso. The garment includes at least one fluid bladder defining a pressurizable chamber adapted to receive the pressurized fluid from the fluid chamber to provide a force of high frequency pressure oscillation to a patient's chest wall.

In some embodiments of the second aspect, the garment may produce a unique pressure waveform. The pressure waveform generated by the control circuitry from the pressure detected may be compared to the unique pressure waveform to identify the garment. The unique pressure waveform may include at least one of a unique minimum pressure and maximum pressure, a unique peak to peak pressure value, and a unique air pulse generator inflation pressure. The pressure waveform generated by the control circuitry from the pressure detected may be compared to the unique pressure waveform to identify a size of the garment.

It may be contemplated, in the second aspect, that the pressure waveform generated by the control circuitry may indicate pressure changes due to respiration of the patient. The pressure changes due to respiration of the patient are caused by compression of the garment resulting in a change in fluid volume in the garment. The change in fluid volume in the garment may increase the pressure detected by the pressure sensor.

It may be desired, in the second aspect, that the pressure waveform generated by the control circuitry may be indicative of a breathing pattern of the patient. The control circuitry may store breathing pattern data indicative of the breathing pattern of the patient in a memory of the air pulse generator. A historical assessment of the breathing pattern data may be indicative of the patient's lung health. The breathing pattern data may be acquired without an electrical connection between the patient and the control circuitry. The control circuitry may perform a Fast Fourier Transform of the pressure waveform to determine the breathing pattern data. A hose may direct the pressurized fluid from the fluid chamber of the air pulse generator to the at least one fluid bladder of the garment.

According to a third aspect of the disclosed embodiments, a method of detecting pressure in a high frequency chest wall oscillation therapy system includes generating, with a motor, compression and expansion of a fluid in a fluid chamber of an air pulse generator to generate pressurized fluid. The method also includes directing the pressurized fluid to at least one fluid bladder of a garment configured to be worn by a patient to provide a force of high frequency pressure oscillation to the patient's chest wall. The method also includes detecting, with a pressure sensor having a port positioned within the fluid chamber of the air pulse generator, a pressure of the pressurized fluid in the fluid chamber. The method also includes generating, with control circuitry of the air pulse generator, a pressure waveform of the pressurized fluid based on the pressure detected.

In some embodiments of the third aspect, the garment may produce a unique pressure waveform. The method may also include comparing the pressure waveform generated by the control circuitry from the pressure detected to the unique pressure waveform to identify the garment. The unique pressure waveform may include at least one of a unique minimum pressure and maximum pressure, a unique peak to peak pressure value, and a unique air pulse generator inflation pressure. The method may also include comparing the pressure waveform generated by the control circuitry from the pressure detected to the unique pressure waveform to identify a size of the garment.

Optionally, in the third aspect, the pressure waveform generated by the control circuitry may indicate pressure changes due to respiration of the patient. The pressure changes due to respiration of the patient may be caused by compression of the garment resulting in a change in fluid volume in the garment. The change in fluid volume in the garment may increase the pressure detected by the pressure sensor.

It may be desired, in the third aspect, that the pressure waveform generated by the control circuitry may be indicative of a breathing pattern of the patient. The method may also include storing breathing pattern data indicative of the breathing pattern of the patient in a memory of the air pulse generator. The historical assessment of the breathing pattern data may be indicative of the patient's lung health. The method may also include acquiring the breathing pattern data without an electrical connection between the patient and the control circuitry. The method may also include performing a Fast Fourier Transform of the pressure waveform to determine the breathing pattern data.

According to a fourth aspect of the disclosed embodiments, a high frequency chest wall oscillation therapy system includes an air pulse generator including control circuitry. The air pulse generator also includes a fluid chamber carrying a fluid. A motor is configured to generate compression and expansion of the fluid in the fluid chamber to generate pressurized fluid. A pressure sensor detects a pressure of the pressurized fluid in the fluid chamber. The control circuitry generates a pressure waveform of the pressurized fluid based on the pressure detected. The control circuitry derives respiratory data based on the pressure waveform. A garment is providing for dressing on a patient's torso. The garment includes at least one fluid bladder defining a pressurizable chamber adapted to receive the pressurized fluid from the fluid chamber to provide a force of high frequency pressure oscillation to a patient's chest wall. The motor is controlled by the control circuitry to alter a flow of the pressurized fluid from the fluid chamber to the pressurizable chamber based on the respiratory data.

In some embodiments of the fourth aspect, the pressure waveform may be passed through a low pass filter to derive the respiratory data. The respiratory data may be differentiated to acquire a signal indicative of airflow from the patient. The signal indicative of airflow from the patient includes an inhalation segment indicative of inhalation by the patient and an exhalation segment indicative of exhalation of the patient. The motor may be altered to decrease the flow of the pressurized fluid from the fluid chamber to the pressurizable chamber when the patient inhales. The motor may be altered to increase the flow of the pressurized fluid from the fluid chamber to the pressurizable chamber when the patient exhales. The motor may be operated at a low state when the patient inhales. The motor may be operated at a high state when the patient exhales. The force of high frequency pressure oscillation to the patient's chest wall may include a compressive force and an opposite expansive force. The compressive force may be synchronized with an exhalation by the patient. The expansive force may be synchronized with an inhalation by the patient.

Optionally, in the fourth aspect, the fluid chamber can be defined between two reciprocating members that are moved toward and away from each other by the motor. The pressure can be detected by the pressure sensor between the reciprocating members. The reciprocating members can include pistons. The reciprocating members can include diaphragms.

According to a fifth aspect of the disclosed embodiments, a method of operating a high frequency chest wall oscillation therapy system may include generating, with a motor, compression and expansion of a fluid in a fluid chamber of an air pulse generator to generate pressurized fluid. The method may also include directing the pressurized fluid to at least one fluid bladder of a garment configured to be worn by a patient to provide a force of high frequency pressure oscillation to the patient's chest wall. The method may also include detecting a pressure of the pressurized fluid in the fluid chamber. The method may also include generating, with control circuitry of the air pulse generator, a pressure waveform of the pressurized fluid based on the pressure detected. The method may also include acquiring respiratory data based on the pressure waveform. The method may also include controlling the motor to alter a flow of the pressurized fluid from the fluid chamber to the at least one fluid bladder of the garment based on the respiratory data.

In some embodiments of the fifth aspect, the method may also include passing the pressure waveform through a low pass filter to acquire the respiratory data. The method may also include differentiating the respiratory data to acquire a signal indicative of airflow from the patient. The signal indicative of airflow from the patient may include an inhalation segment indicative of inhalation by the patient and an exhalation segment indicative of exhalation of the patient. The method may also include altering motor to decrease the flow of the pressurized fluid from the fluid chamber to the at least one fluid bladder of the garment when the patient inhales. The method may also include altering the motor to increase the flow of the pressurized fluid from the fluid chamber to the at least one fluid bladder of the garment when the patient exhales. The method may also include operating the motor at a low state when the patient inhales. The method may also include operating the motor at a high state when the patient exhales. The force of high frequency pressure oscillation to the patient's chest wall may include a compressive force and an opposite expansive force. The method may also include synchronizing the compressive force with an exhalation by the patient. The method may also include synchronizing the expansive force with an inhalation by the patient.

Optionally, in the fifth aspect, the fluid chamber can be defined between two reciprocating members that are moved toward and away from each other by the motor. Detecting a pressure of the pressurized fluid in the fluid chamber can include detecting the pressure between the reciprocating members. The reciprocating members can include pistons. The reciprocating members can include diaphragms.

Additional features, which alone or in combination with any other feature(s), such as those listed above and those listed in the claims, may comprise patentable subject matter and will become apparent to those skilled in the art upon consideration of the following detailed description of various embodiments exemplifying the best mode of carrying out the embodiments as presently perceived.

BRIEF DESCRIPTION OF THE DRAWINGS

The detailed description particularly refers to the accompanying figures in which.

DETAILED DESCRIPTION

Figure 1:
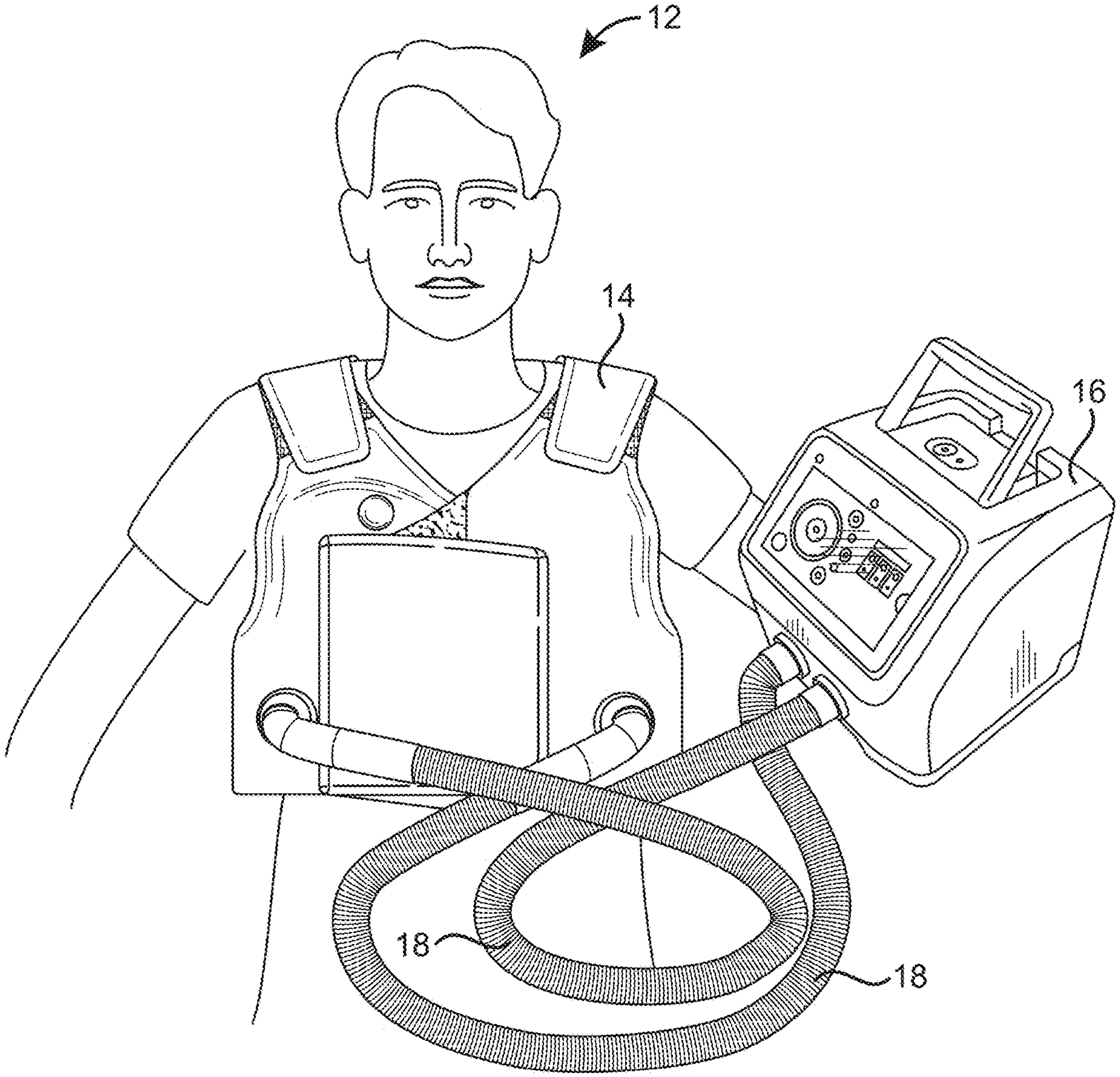
FIG. 1 is a perspective view of a high frequency chest wall oscillation therapy system having an air pulse generator fluidly coupled to a garment configured to be worn by a patient, wherein the air pulse generator delivers pressurized fluid from a fluid chamber to the garment to provide a force of high frequency pressure oscillation to a patient's chest wall.

While the concepts of the present disclosure are susceptible to various modifications and alternative forms, specific exemplary embodiments thereof have been shown by way of example in the drawings and will herein be described in detail. It should be understood, however, that there is no intent to limit the concepts of the present disclosure to the particular forms disclosed, but on the contrary, the intention is to cover all modifications, equivalents, and alternatives falling within the spirit and scope of the invention as defined by the appended claims.

Referring now to FIG. 1, a high frequency chest wall oscillation therapy system (HFCWO) system 12 is shown including a chest engagement device 14 embodied as a wearable therapy garment vest, an air pulse generator (e.g., pump) 16 in communication with the garment 14 via one or more fluid hoses 18 to provide pressurized fluid oscillation communicated by the garment 14 to the patient's torso region to provide impact force to the patient's chest wall. Non-limiting examples of a suitable force generator and/or force generation mechanism, for example, as force generator 16 and the GUI screens for control and/or operations such generators and/or mechanisms, is provided as within U.S. patent application Ser. No. 17/093,764, entitled Adaptive High Frequency Chest Wall Oscillation System, filed on Nov. 10, 2020, the contents of which are incorporated by reference in their entirety, including but not limited to those portions concerning high frequency chest wall oscillation systems, devices, and methods. The garment 14 illustratively includes one or more pressurizable chambers that are arranged in communication with the pump 16 to receive successive pressurization and depressurization to inflate and partly deflate imposing an oscillating impact force on the patient. The application of successive impact force to impose high frequency oscillation of the chest wall as a therapy regime can assist in dislodging mucus from the upper respiratory tract.

Figure 2:
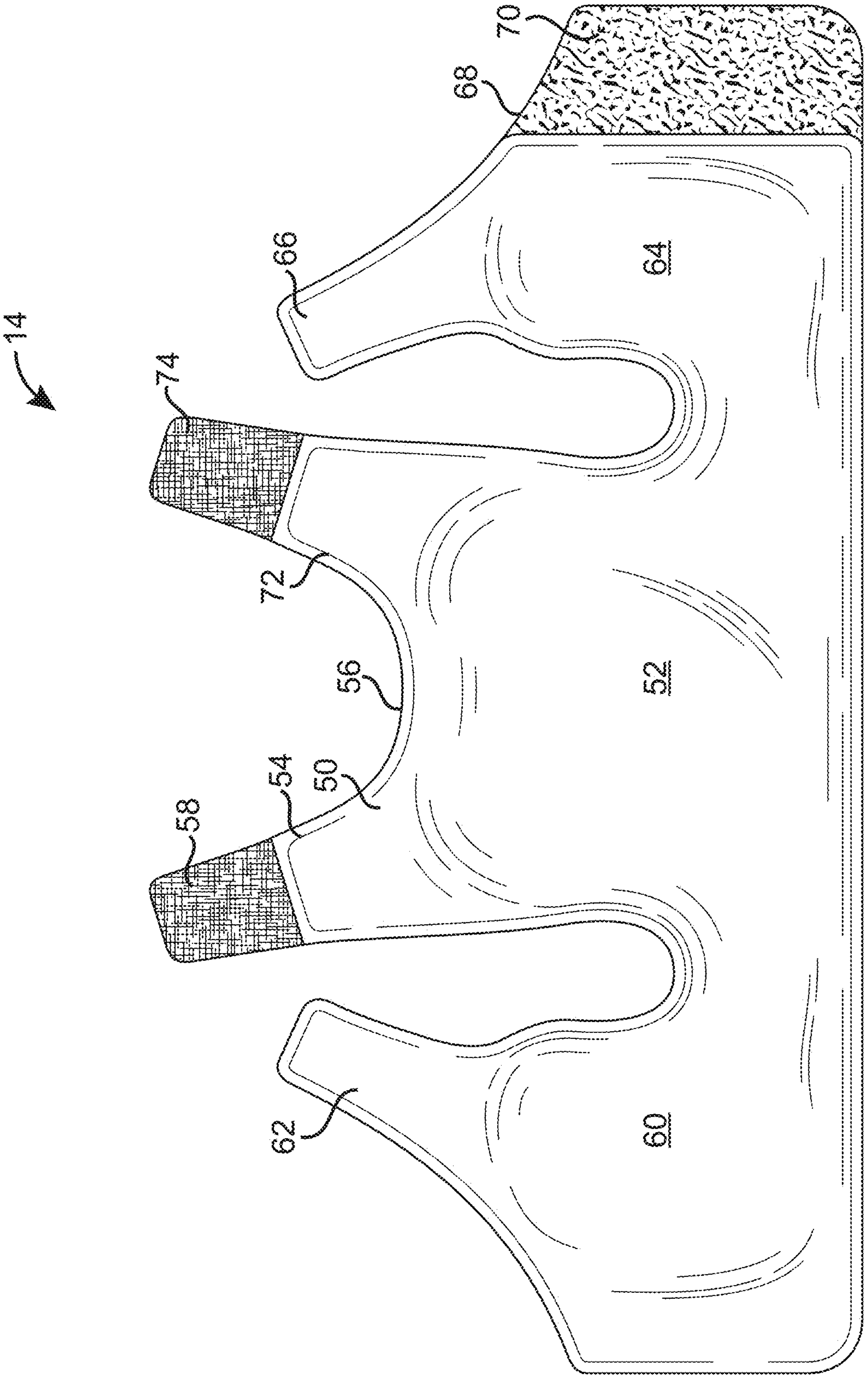
FIG. 2 is an inside view of the garment configured to be worn by the patient.

FIG. 2 illustrates an inside 50 of the garment 14, wherein the inside 50 is configured to position against a patient's body. The garment 14 includes a center panel 52 having a right shoulder flange 54 and a left shoulder flange 72 extending from a top 56 of the center panel 52. The right shoulder flange 54 includes a fastener 58, e.g. a hook and loop fastener. The left shoulder flange 72 includes a fastener 74, e.g. a hook and loop fastener. It will be appreciated that any suitable fastener may be positioned on the right shoulder flange 54 and the left shoulder flange 72. The center panel 52 is configured to position against the patient's back. The shoulder flanges 54 and 72 are configured to position over the patient's shoulders.

A right side panel 60 extends from the center panel 52 and is configured to be positioned against the right side of the patient's chest. A right shoulder flange 62 extends upward from the right side panel 60. A left side panel 64 extends from the center panel 52 and is configured to be positioned against the left side of the patient's chest. A left shoulder flange 66 extends upward from the left side panel 64. The left side panel 64 includes a flange 68 extending therefrom and having a fastener 70, e.g. a hook and loop fastener. It will be appreciated that any suitable fastener may be positioned on the flange 68.

Figure 3:
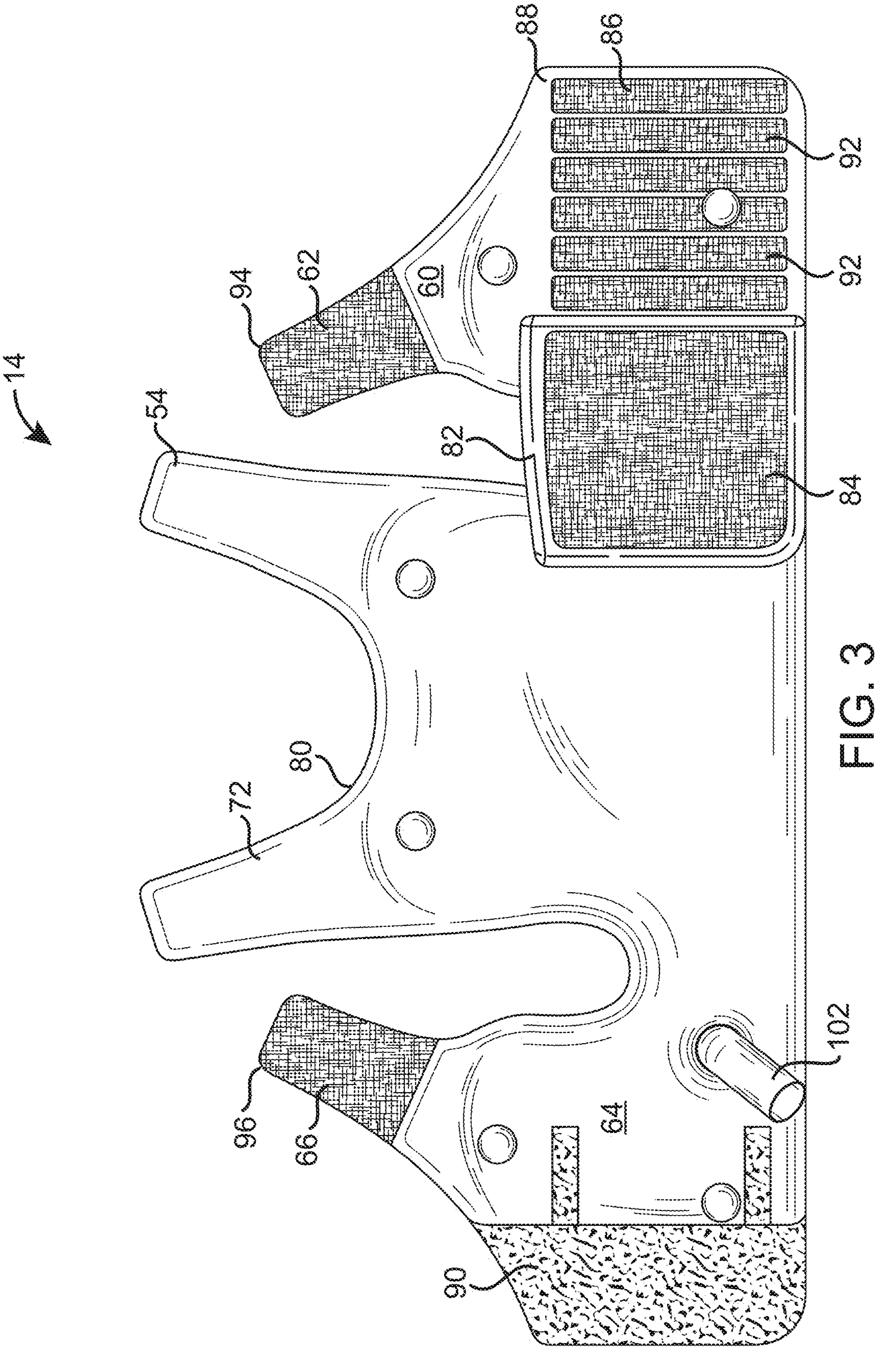
FIG. 3 is an outside view of the garment configured to be worn by the patient.

FIG. 3 illustrates an outside 80 of the garment 14. The right side panel 60 includes a flap 82 extending therefrom and having a fastener 84, e.g. a hook and loop fastener. It will be appreciated that any suitable fastener may be positioned on the flap 82. Another fastener 86, e.g. a hook and loop fastener, is positioned on an end 88 of the right side panel 60. The flap 82 is configured to move between a closed position, wherein the flap 82 lies over the end 88, and an open position, wherein the flap 82 is cantilevered from the right side panel 60. The left side panel 64 includes a fastener 90, e.g. a hook and loop fastener. It will be appreciated that any suitable fastener may be positioned on the left side panel 64.

When the garment 14 is secured to the patient, the center panel 52 is positioned on the patient's back and the right side panel 60 is wrapped around the patient's chest with the flap 82 in the open position. The left side panel 64 is then wrapped around the patient's chest so that the fastener 70 secures to the fastener 86 on the end 88 of the right side panel 60. The fastener 86 includes a plurality of fastener sections 92 that enable the patient to identify a location of the left side panel 64 on the right side panel 60, i.e. positioned at the third fastener section 92. Accordingly, during subsequent uses of the garment 14, the garment 14 may be comfortably positioned on the patient by adhering the left side panel 64 at the same location on the right side panel 60 during each use. The flap 82 is then moved to the closed position so that the fastener 84 on the flap 82 is secured to the fastener 90 of the left side panel 64.

The right shoulder flange 62 includes a fastener 94, e.g. a hook and loop fastener, and the left shoulder flange 66 includes a fastener 96, e.g. a hook and loop fastener. It will be appreciated that any suitable fastener may be positioned on the right shoulder flange 62 and the left shoulder flange 66. The right shoulder flange 54 is wrapped around the patient's right shoulder so that the fastener 58 secures to the fastener 94 of the right shoulder flange 62. The left shoulder flange 72 is wrapped around the patient's left shoulder so that the fastener 74 secures to the fastener 96 of the left shoulder flange 66.

Figure 4:
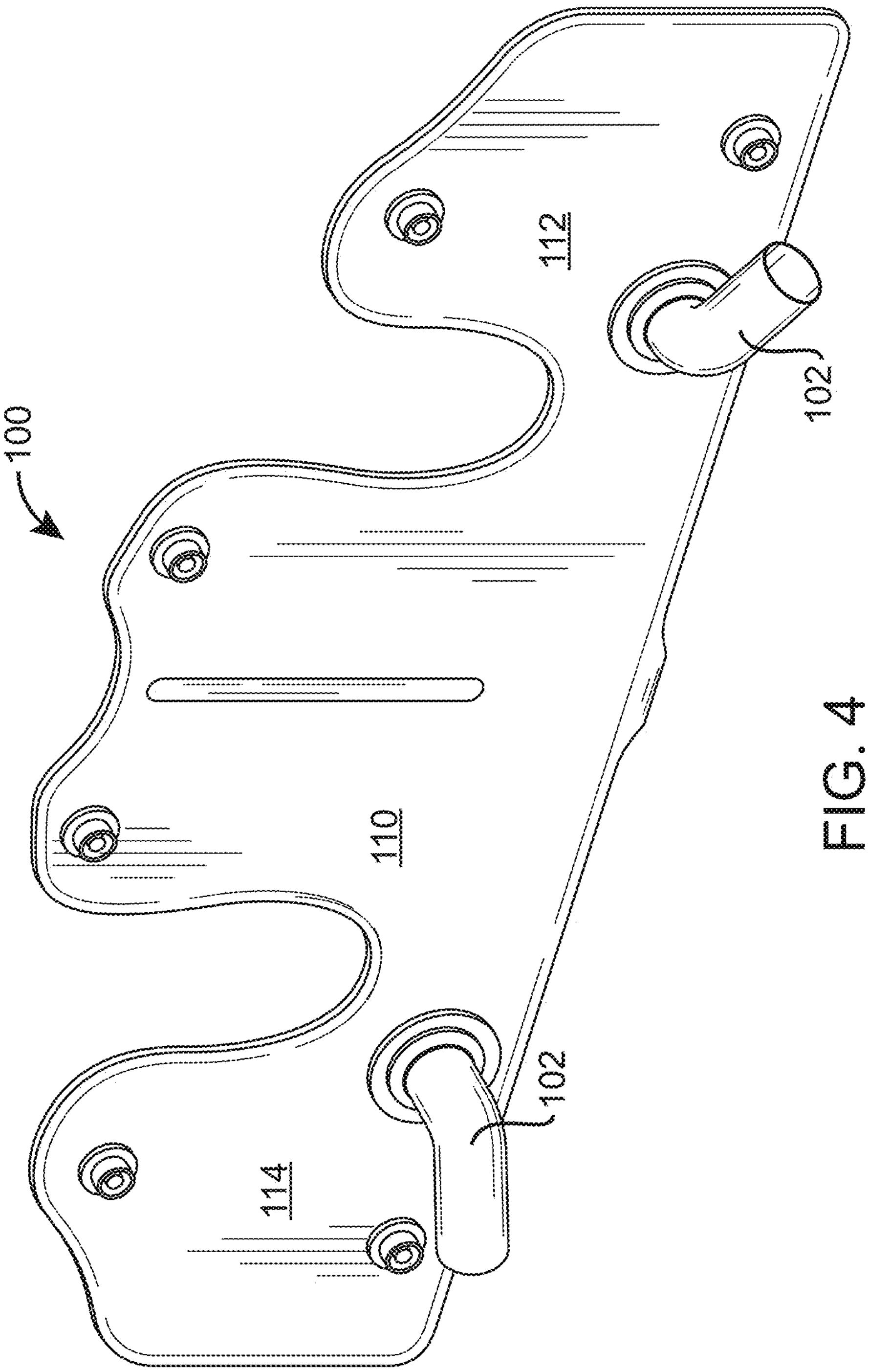
FIG. 4 is a back view of a fluid bladder positioned in the garment.

The outside 80 and the inside 50 of the garment 14 form a pocket for at least one fluid bladder 100, as shown in FIG. 4. A hose port 102 for each hose 18 extends from the fluid bladder 100 through the outside 80 of the garment 14, as shown in FIG. 3. Referring the FIG. 4, the fluid bladder 100 includes a center panel 110. A right side panel 112 and left side panel 114 each extend from the center panel 110. The center panel 110 is configured to position in the center panel 52 of the garment 14, so that the center panel 110 is positioned adjacent the patient's back. The right side panel 112 is configured to position in the right side panel 60 of the garment 14, so that the right side panel 112 is positioned adjacent the right side of the patient's chest. The left side panel 114 is configured to position in the left side panel 64 of the garment 14, so that the left side panel 112 is positioned adjacent the left side of the patient's chest.

A hose port 102 is fluidly coupled to each of the right side panel 112 and the left side panel 114 to couple to a hose 18. Pressurized fluid from the air pulse generator 16 is directed into the fluid bladder 100 from the hoses 18 and through the respective hose port 102 to oscillate pressure in the fluid bladder 100. It will be appreciated that the fluid bladders 100 may include a plurality of fluid bladders that each receive pressurized fluid from the air pulse generator 16.

Figure 5:
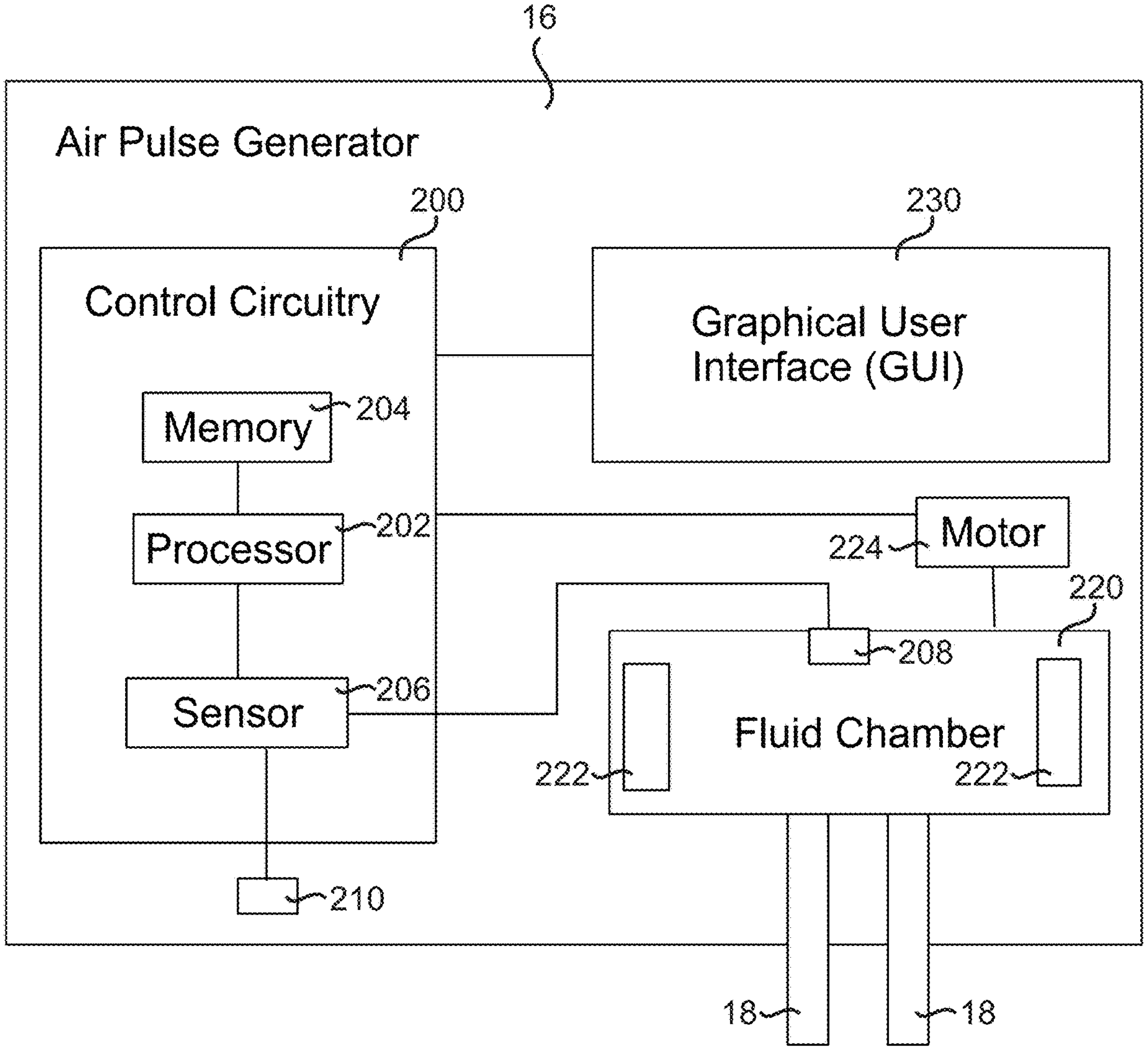
FIG. 5 is a schematic view of the components of the air pulse generator.

Referring now to FIG. 5, the air pulse generator 16 includes control circuitry 200. The control circuitry 200 is sometimes referred to as a "controller." The control circuitry 200 is represented diagrammatically as a single block in FIG. 5, but the control circuitry 200 in some embodiments, comprises various circuit boards, electronics modules, and the like that are electrically and communicatively interconnected. The control circuitry 200 includes one or more microprocessors 202 or microcontrollers that execute software to perform the various control functions and algorithms described herein. Thus, the control circuitry 200 also includes a memory 204 for storing software, variables, calculated values, and the like as is well known in the art. The memory 204 comprises, for example, one or more flash memory banks such as one or more EEPROM's, EPROM's, and the like. In some embodiments, the memory 204 is included on the same integrated circuit chip as the microprocessor 202.

A pressure sensor 206 is electrically coupled to the microprocessor 202. In some embodiments, the pressure sensor 206 includes a differential sensor. The pressure sensor 206 includes a first port 208 that measures a pressure of pressurized fluid in the air pulse generator 16, as described below. A second port 210 measures the atmospheric pressure of ambient air in the air pulse generator 16. Although the second port 210 is illustrated as being positioned within the air pulse generator 16, it will be appreciated that the second port 210 may be positioned outside of the air pulse generator 16. The control circuitry 200 is configured to compare the pressure of the pressurized fluid in the air pulse generator 16 to the atmospheric pressure to generate a waveform of the pressure in the air pulse generator 16.

A fluid chamber 220 retains fluid, e.g. air, and is configured to pressurize the fluid. The fluid chamber 220 includes a pair of pistons 222 that are electrically coupled to a motor 224. The control circuitry 200 controls the motor 224 to oscillate the pistons 222 to compress and expand the fluid in the fluid chamber 220, thereby pressurizing the fluid. The pressurized fluid is expelled from the fluid chamber 220 to the garment 14 through at least one hose 18. Although the illustrated embodiments include two hoses 18, it will be appreciated that system 12 may include any number of hoses 18.

The first port 208 of the pressure sensor 206 is positioned inside the fluid chamber 220. In the exemplary embodiment, the first port 208 is positioned between the pistons 222. In some embodiments, the first port 208 is centered between the pistons 222. It will be appreciated that, in some embodiments, the first port 208 may be positioned at any location within the fluid chamber 220. Positioning the first port 208 within the fluid chamber 220 enables the pressure sensor 206 to determine a pressure of the pressurized fluid within the fluid chamber 220.

The control circuitry 200 compares the pressure of the pressurized in the fluid chamber 220, as measured at the first port 208, to the ambient pressure, as measured by the second port 210, to generate the waveform indicative of the pressure of the pressurized fluid in the fluid chamber 220. A graphical user interface (GUI) 230 is configured to display the waveform of the pressure of the pressurized fluid in the fluid chamber 220. As set forth below, the waveform may be utilized to identify a type of garment 14 coupled to the air pulse generator 16 and/or to determine a respiratory signal of the patient wearing the garment 14. It will be appreciated that the GUI 230 may display additional information related to the system 12. In some embodiments, the GUI 230 includes touch screen inputs to control the system 12. In other embodiments, the air pulse generator 16 includes inputs to control the system 12 by navigating various screens on the GUI 230.

Figure 6:
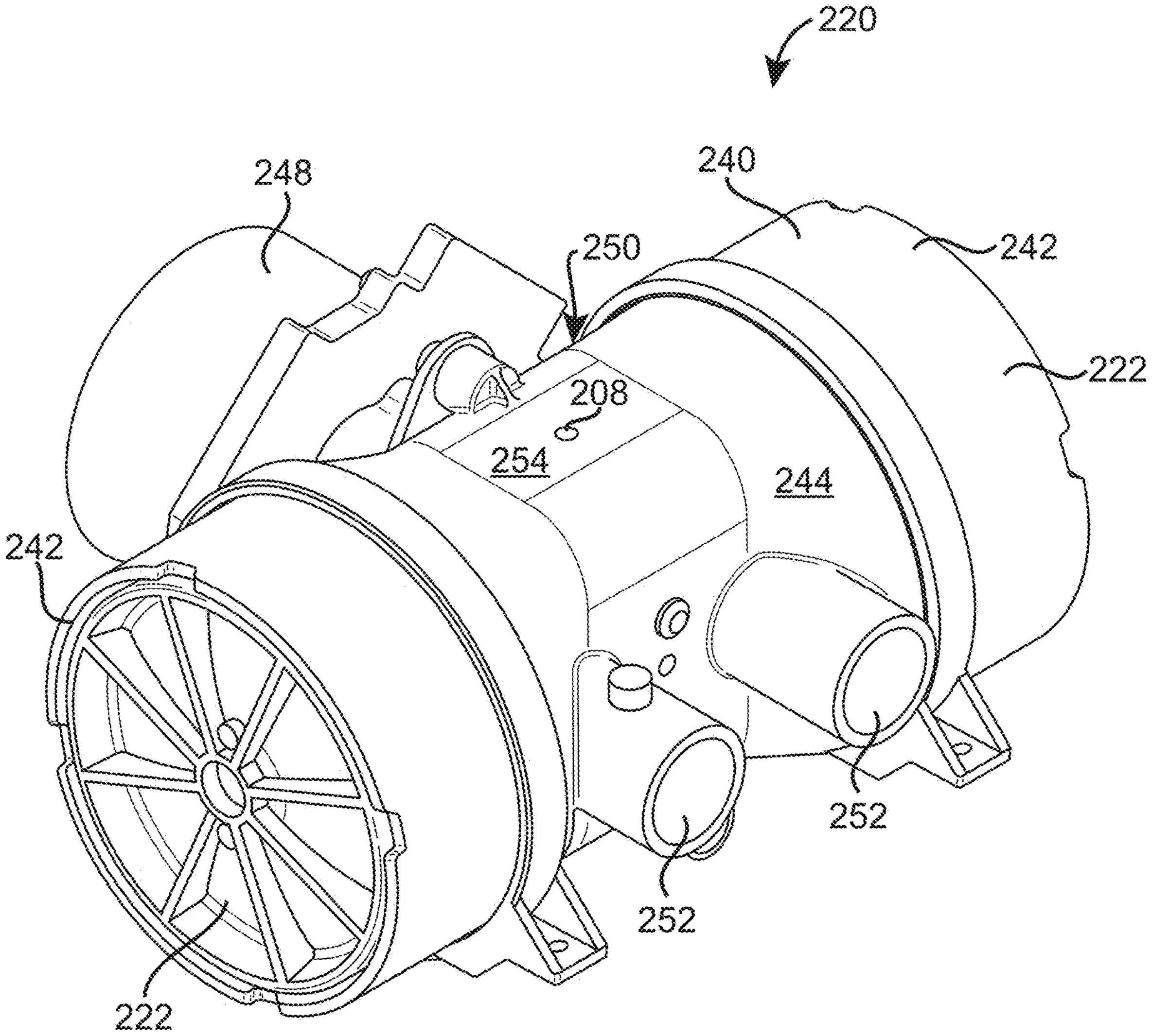
FIG. 6 is a perspective view of the fluid chamber of the air pulse generator configured to generate pressurized fluid.

Referring to FIG. 6, the fluid chamber 220 includes a body 240 having a pair of ends 242 and at least one side wall 244 extending between the ends 242. Each of the pistons 222 is positioned at a respective end 242 so that a cavity is defined between the pistons 222. The pistons 222 are configured to oscillate toward and away from the cavity to pressurize the fluid within the cavity.

An inlet port 248 extends from a back side 250 of the sidewall 244 and is open to ambient air. Fluid flows into the cavity through the inlet port 248. In some embodiments, a check valve (not shown) prevents the fluid from escaping the cavity. The fluid is then pressurized by the pistons 222 in the cavity. A pair of outlet ports 252 extend from a front side 254 of the sidewall 244 to discharge the pressurized fluid. Each outlet port 252 is coupled to a hose 18 to discharge the fluid to the garment 14. It will be appreciated that the fluid chamber 220 may include any number of outlet ports 252. In some embodiments, the number of outlet ports 252 corresponds to a number of hoses 18 utilized by the system 12.

The first port 208 of the pressure sensor 206 extends through the sidewall 244. In the illustrative embodiment, the first port 208 extends through a top 254 of the sidewall 244. It will be appreciated that the first port 208 may extend through any location of the sidewall 244. In the exemplary embodiment, the first port 208 is centered between the pistons 222 to measure a pressure of the pressurized fluid at the center of the cavity. In other embodiments, the first port 208 is located at any position between the pistons 222 and measures the pressure of the pressurized fluid at the respective location.

Figure 7:
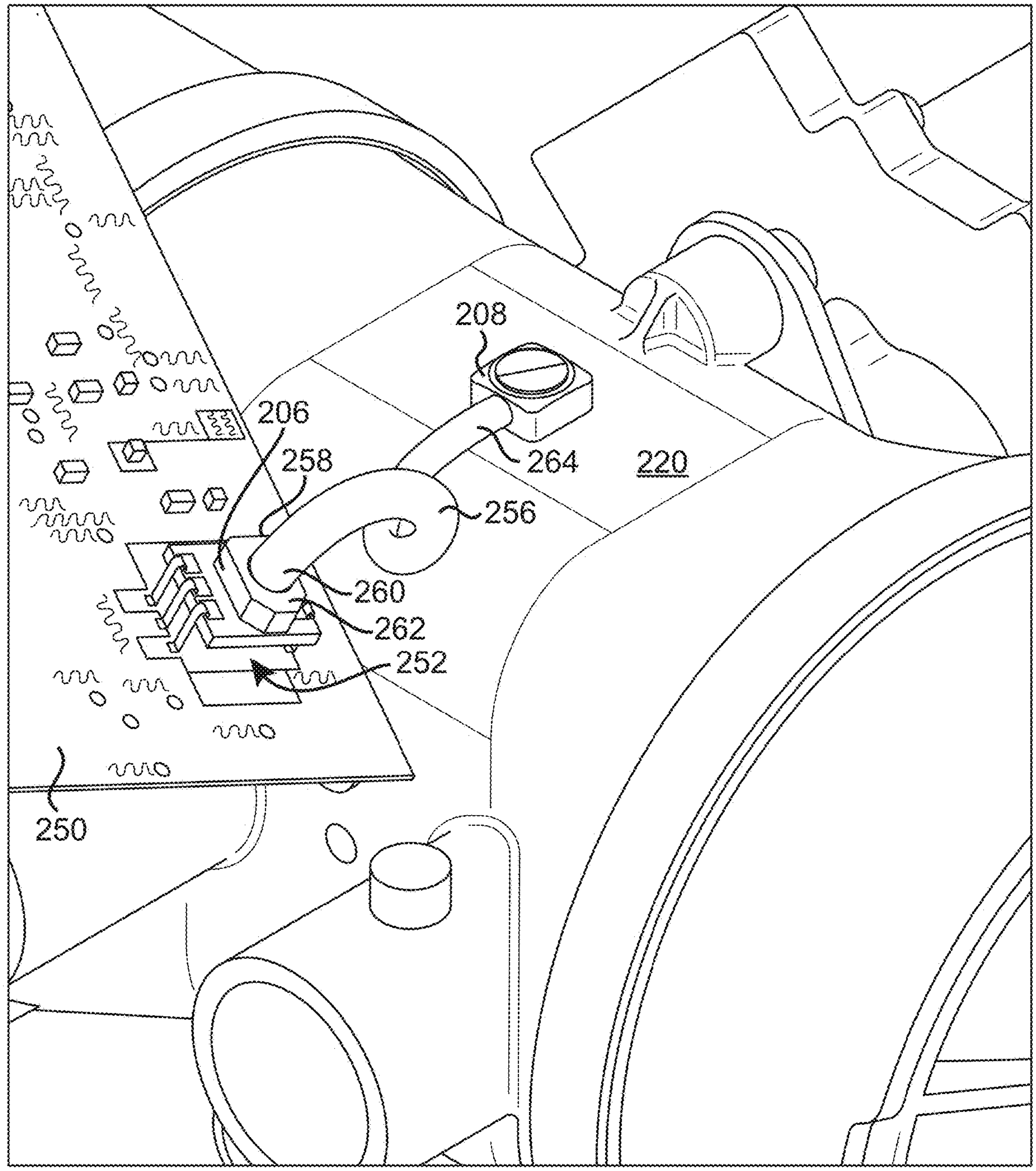
FIG. 7 is a perspective view of a pressure sensor positioned on the control circuitry and having a first port extending the to the fluid chamber to detect a pressure in the fluid chamber and a second port positioned under the sensor to detect ambient pressure.

Referring now to FIG. 7, a circuit board 250 of the control circuitry 200 includes various electrical components configured to carry out the various control functions and algorithms described herein. It will be appreciated that the control circuitry 200 may include any number of circuit boards and components. The illustrated circuit board 250 is intended to show an exemplary embodiment of a configuration of the pressure sensor 206. The pressure sensor 206 is electrically coupled to the circuit board 250 so that a space 252 is provided between the pressure sensor 206 and the circuit board 250. The second port 210 of the pressure sensor 206 is positioned in the space 252 so that the second port 210 is exposed to ambient air in the space 252. It will be appreciated that the second port 210 may be positioned at any location in the air pulse generator 16 that is subject to atmospheric air pressure. In some embodiments, the second port 201 is position outside of the air pulse generator 16, e.g. extending through a housing of the air pulse generator 16.

A tube 256 extends from a top 258 of the pressure sensor 206 to the fluid chamber 220. A first end 260 of the tube 256 is secured to an inlet 262 of the pressure sensor 206. A second end 264 of the tube 256 is secured to the first port 208 positioned in the fluid chamber 220. Pressurized fluid in the fluid chamber 220 passes from first port 208 in the fluid chamber 220 through the tube 256 to the pressure sensor 206 so that the pressure sensor 206 measures a pressure of the pressurized fluid in the fluid chamber 220. The pressure sensor 206 further measures the pressure of ambient air at the second port 210. The measured pressures are compared by the control circuitry through signals passing through the circuit board 250 to generate a pressure waveform indicative of the pressure of the pressurized fluid in the fluid chamber 220. The pressure waveform is then displayed on the GUI 230

In an exemplary embodiment, the pressure waveform generated by the control circuitry 200 is indicative of a type of garment 14 coupled to the air pulse generator 16. That is every garment 14 produces a unique pressure waveform that is unique to a type of garment 14 and a size of the garment 14. In some embodiments, the unique pressure waveform includes a unique minimum pressure and maximum pressure. In some embodiments, the unique pressure waveform includes a unique peak to peak pressure value. In some embodiments, the unique pressure waveform includes a unique air pulse generator inflation pressure.

Accordingly, upon activating the system 12, a pressure waveform is generated by the control circuitry 200 based on the detected pressure of the pressurized fluid in the fluid chamber 220. The control circuitry 200 then compares generated pressure waveform to various unique pressure waveforms to identify the garment 14. For example, a type of garment 14 may be identified and/or a size of the garment 14 may be identified. This identification may take place while the garment 14 is secured to the patient or before the garment 14 is secured to the patient. For example, the garment 14 may be off the patient when the system 12 is first activated and the control system 200 generates the pressure waveform without therapy having begun. In another embodiment, the garment 14 may be positioned on the patient and activated without beginning therapy. As such, the pressure sensor 206 may detect pressure within the fluid chamber 220 prior to receiving feedback from patient therapy.

Figure 8:
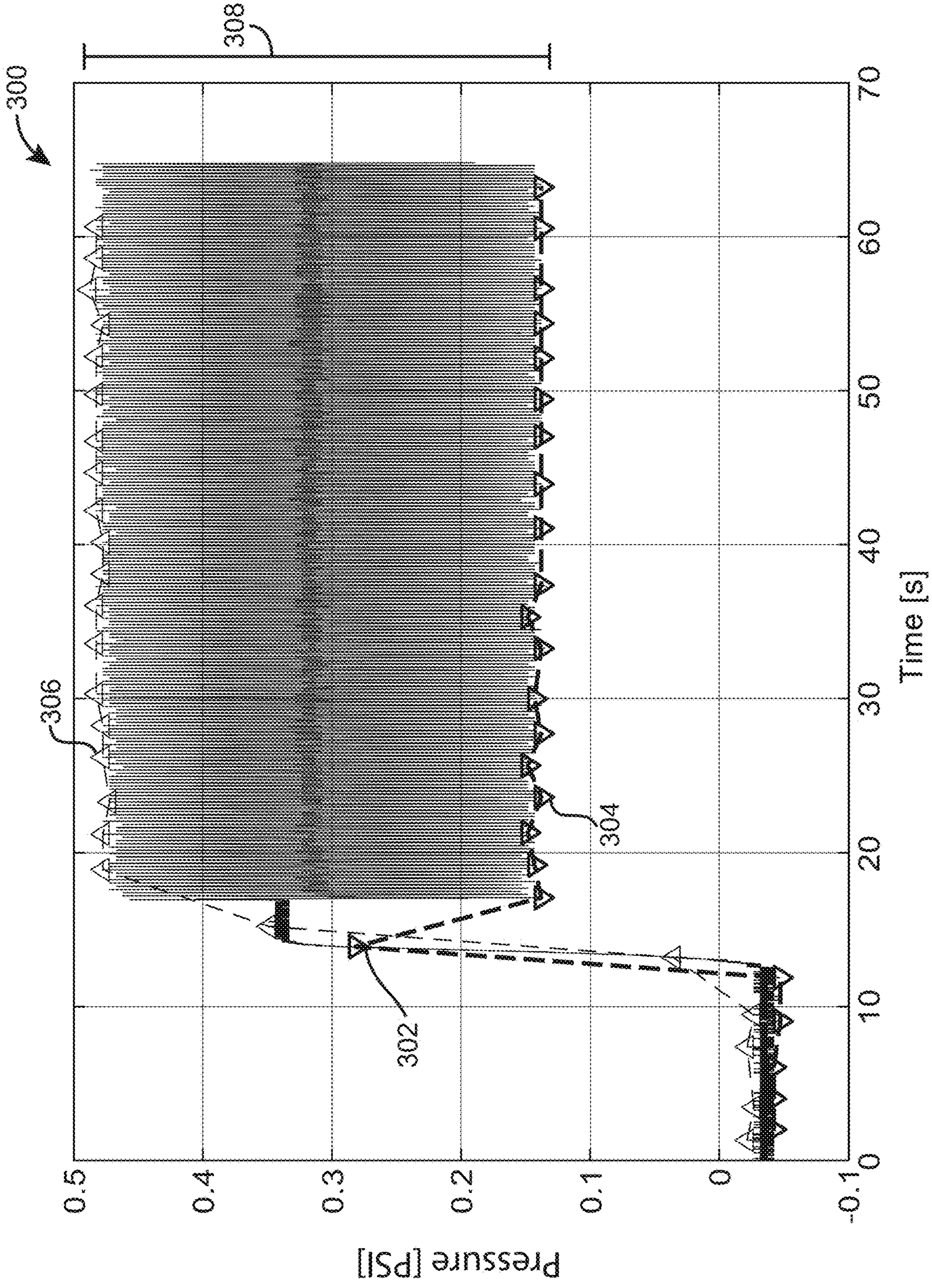
FIG. 8 is a waveform generated by the control circuitry from pressures detected by the pressure sensor, wherein the waveform is indicative of a type of garment.

FIG. 8 illustrates an exemplary unique pressure waveform 300 generated by a garment 14. In the exemplary embodiment, the garment 14 is an adult small garment 14 and the air pulse generator 16 is operated at 5 Hz. The waveform 300 has an inflation pressure 302 of approximately 0.34 PSI. The waveform 300 also has a minimum pressure 304 of approximately 0.14 PSI and a maximum pressure 306 of approximately 0.48 PSI. A peak to peak pressure value 308 of the waveform 300 is approximately 0.34 PSI.

Figure 9:
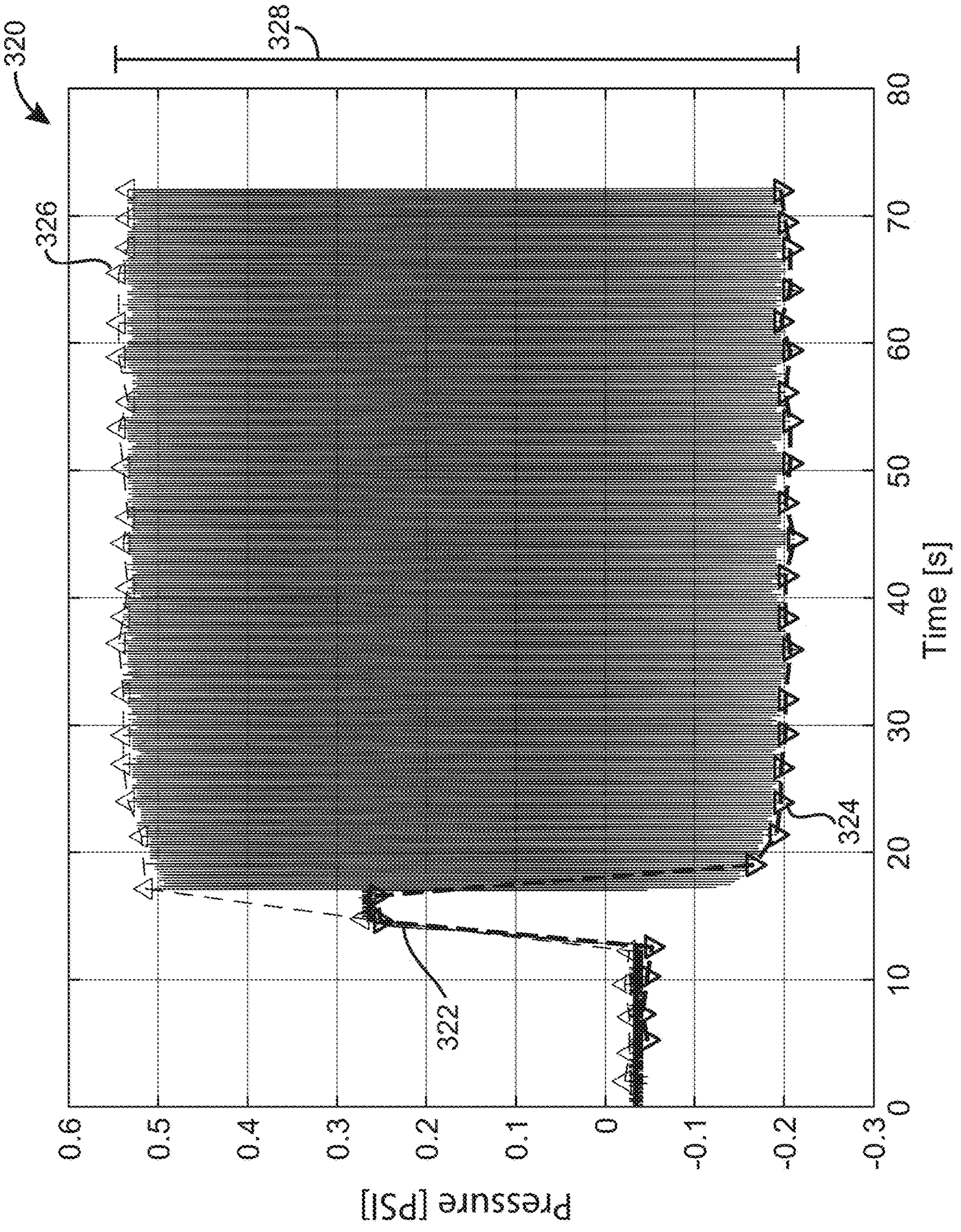
FIG. 9 is another waveform generated by the control circuitry from pressures detected by the pressure sensor, wherein the waveform is indicative of another type of garment.

FIG. 9 illustrates an exemplary unique pressure waveform 320 generated by a garment 14. In the exemplary embodiment, the garment 14 is a baby size garment 14 and the air pulse generator 16 is operated at 5 Hz. The waveform 320 has an inflation pressure 322 of approximately 0.28 PSI, which is less than the inflation pressure 302 of the waveform 300. The waveform 320 also has a minimum pressure 324 of approximately 0.2 PSI and a maximum pressure 326 of approximately 0.52 PSI, both of which are greater than the minimum pressure 304 and the maximum pressure 306 of the waveform 300. A peak to peak pressure value 328 of the waveform 320 is approximately 0.72 PSI, which is greater than the peak to peak pressure value 328 of the waveform 300.

Accordingly, both the adult small garment 14 and the baby size garment 14 produce unique waveforms, 300 and 320, respectively, that can be utilized to identify the garment 14 when the pressure waveform is generated from the pressure detected in the fluid chamber 220. Each waveform has a unique inflation pressure, minimum pressure, maximum pressure, and peak to peak pressure value. It will be appreciated that any vest type or vest size will have a unique combination of inflation pressure, minimum pressure, maximum pressure, and peak to peak pressure value. By identifying the unique pressure waveform for each vest type and size utilized in a healthcare facility, the pressure waveform generated from the pressure detected in the fluid chamber 220 may be utilized to determine the vest type and size of any garment 14 coupled to the air pulse generator 16. As such, healthcare providers can verify that the correct vest type and size is being utilized with the system 12. In some embodiments, a confirmation of the vest type and size may be displayed on the GUI 230 in response to the control circuitry identifying the vest type and size.

Figure 10:
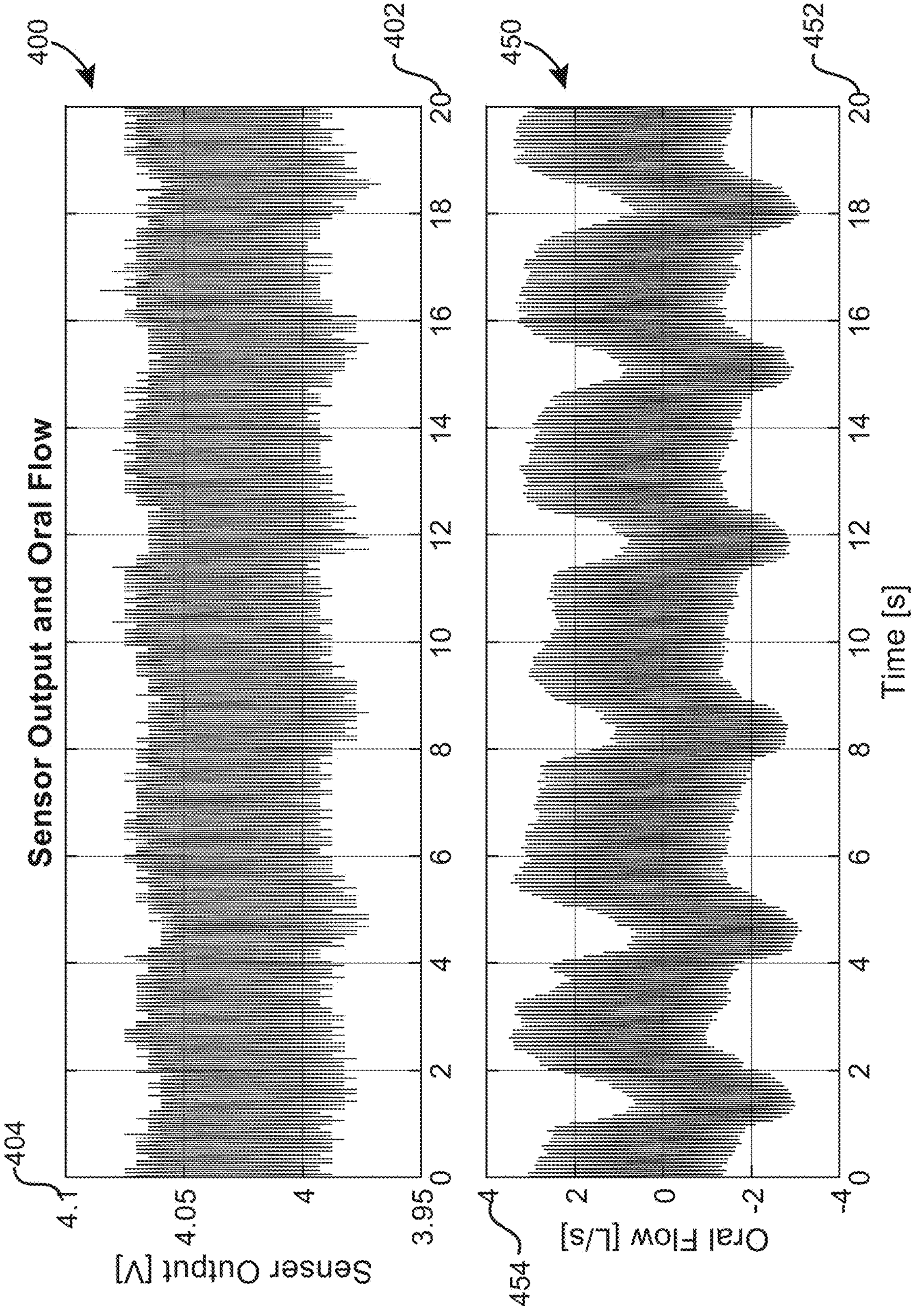
FIG. 10 is a comparison of a first waveform detected by the pressure sensor and a second waveform detected by an oral sensor.

FIG. 10 illustrates a comparison of a voltage waveform 400 generated by the control circuitry 200 from output from the pressure sensor 206 and an oral flow waveform 450 generated from an oral sensor (not shown) positioned in the patient's airway, e.g. mouth. As illustrated in FIG. 10, the waveform 400 is similar to the waveform 450, thereby by illustrating that the pressure sensor 206 is capable of detecting the voltage data similar to the flow data detected by an oral sensor. As discussed below, with respect to FIGS. 11 and 12, the voltage data can be processed by the control circuitry 200 to generate a respiratory waveform indicative of a breathing pattern of the patient without having an electrical connection to the patient, as is required with an oral sensor.

The voltage waveform 400 is taken over time, as indicated on the x-axis 402. The y-axis 404 illustrates an output 406 of the pressure sensor 206 in volts. As seen in the waveform 400, over time, the voltage detected by the pressure sensor 206 oscillates between 3.95 and 4.1 volts. The flow waveform 450 is also taken over time, as indicated on the x-axis 452 and illustrates liters per second on the y-axis 454. As seen in the flow waveform 450, over time, the liters per second detected by the oral sensor oscillates between −4 and 4 liters per second.

Figure 11:
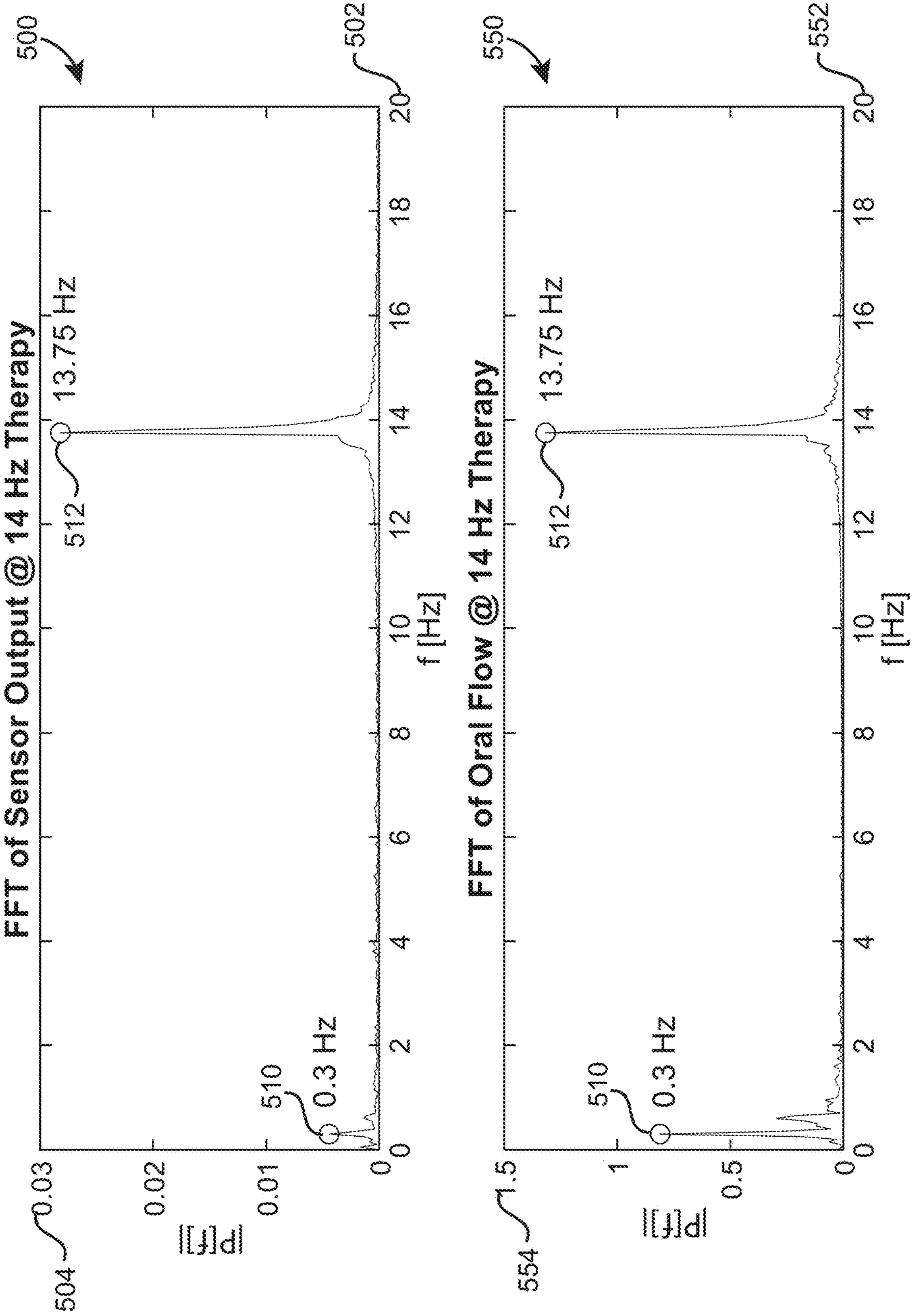
FIG. 11 is a comparison of a first Fast Fourier Transform of the first waveform, shown in FIG. 10, and a second Fast Fourier Transform of the second waveform, shown in FIG. 10.

As illustrated in FIG. 11, a Fast Fourier Transform is performed by the control circuitry 200 on the waveform 400 to generate waveform 500. Waveform 500 illustrates a pressure change on the y-axis 504 over frequency on the x-axis 502. A Fast Fourier Transform of the waveform 450 is illustrated at waveform 550, which shows pressure change on the y-axis 554 over frequency on the x-axis 552. Each waveform 500 and 550 includes a first peak 510 at a frequency of 0.3 Hz and a second peak 512 at a frequency of 13.75 Hz. Accordingly, the pressure sensor 206 can be utilized to determine the same breathing pattern data as the oral sensor. That is, both the pressure sensor 206 and the oral sensor can be utilized to detect the same frequency peaks.

Figure 12:
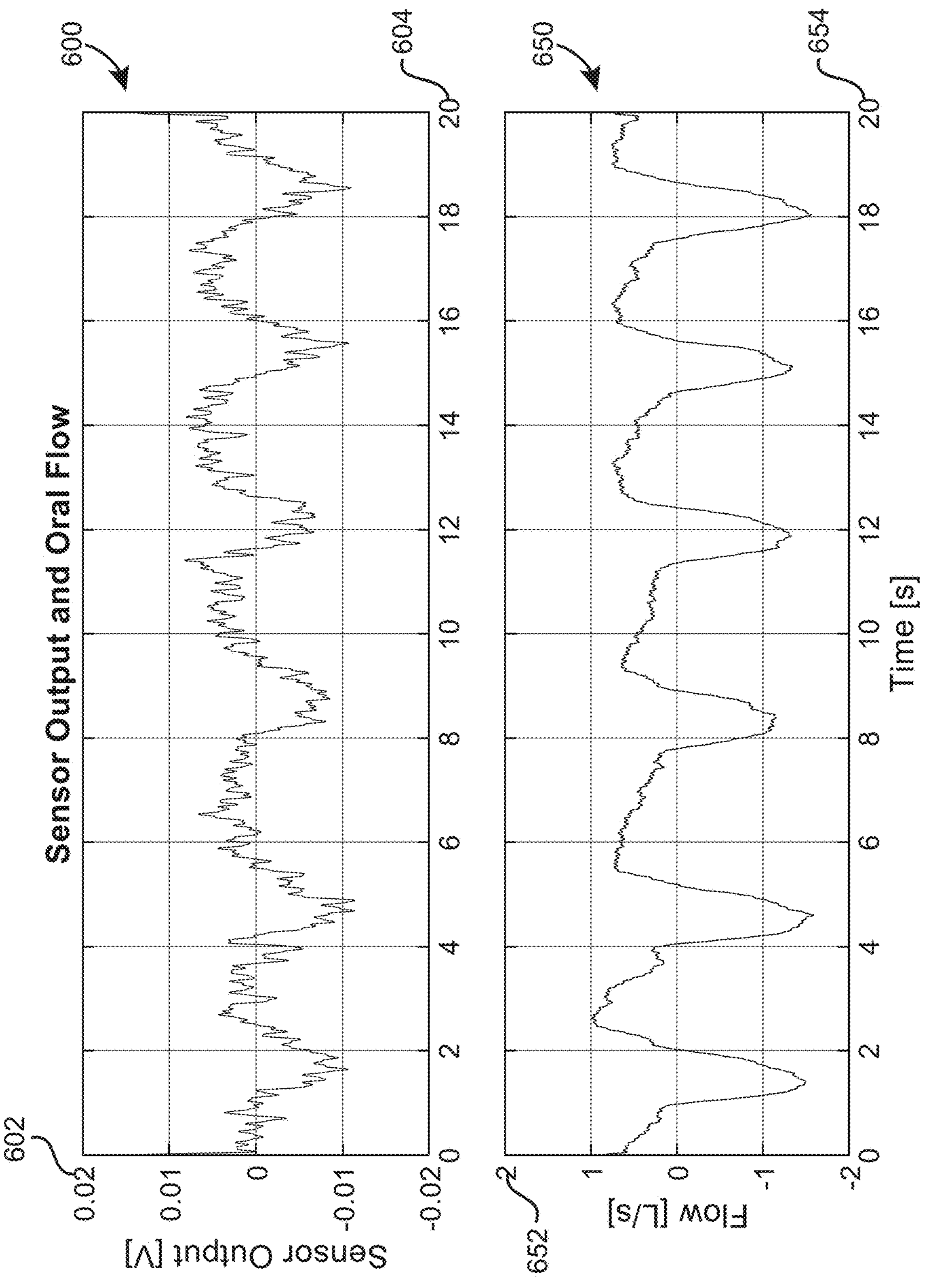
FIG. 12 is a comparison of a respiratory signal of a patient as derived from the first Fast Fourier Transform, shown in FIG. 11, and a respiratory signal of a patient as derived from the second Fast Fourier Transform, shown in FIG. 11.

FIG. 12 illustrates a normalized respiratory waveform generated from data from each of the pressure sensor 206 and the oral sensor. That is, the Fast Fourier Transforms 450 and 550, shown in FIG. 11, can be utilized to normalize the waveforms 400 and 550, respectively. The control circuitry 200 processes the data from the pressure sensor 206 to generate the normalized respiratory waveform 600. The normalized respiratory waveform 600 illustrates voltage on the y-axis 602 over time on the x-axis 604. Over time the normalized respiratory waveform 600 oscillates between −0.02 volts and 0.02 volts. The data from the oral sensor can also be processed to generate the normalized respiratory waveform 650. The normalized respiratory waveform 650 illustrates liters per second on the y-axis 652 over time on the x-axis 654. Over time the normalized respiratory waveform 650 oscillates between −2 liters per second and 2 liters per second.

Known wearable technologies to extract respiration data require an electrical connection to the patient to generate the waveforms 450, 550, and 650. These sensors generally create an open loop system. Such wearable technology to extract respiration data includes pressure sensors mounted on the patient's chest or facemask; acoustic sensors, such as a wireless microphone attached near the nose, mouth, throat region; humidity sensors attached on facemask, oximetry sensors worn on wrist, finger, ear, etc.; motion sensors, e.g. accelerometers gyroscopes, or strain gauges mounted on the patient's chest; or resistive sensor, e.g. piezo or strain gauges, strapped on the patient's chest.

In contrast, in the disclosed embodiments, respiration during therapy results in ribcage movements exerting pressure on the garment 14. When the patient breathes in, the ribcage expands, thereby compressing the garment 14. When the patient breathes out, the ribcage collapses, thereby reducing compression on garment 14. The rhythmic compression on garment 14 creates pressure fluctuation that is reflected in the fluid chamber 220 because the garment 14, the hoses 18, and the fluid chamber 220 form a pseudo closed chamber. Following ideal gas Boyle' law, a change in volume on the garment 14 due to ribcage compression, raises the pressure in the fluid chamber 220. Accordingly, the pressure sensor 206 mounted in the fluid chamber 220 measures the pressure changes due to respiration of the patient, as shown in waveforms 400, 500, and 600, without an electrical connection to the patient.

The waveforms 400, 500, and 600, or related data may be displayed on the GUI 230 to track the patient's breathing pattern data. Incorporating a patient's respiratory feedback information facilitates enabling the system 12 to achieve a more comfortable therapy. Additionally, breathing pattern data and motion can also be collected for historical assessment of the patient's lung's ventilatory function, a subset indicator of the lung's health. Accordingly, the data may be used to diagnose lung health ailments in the patient.

Figure 13:
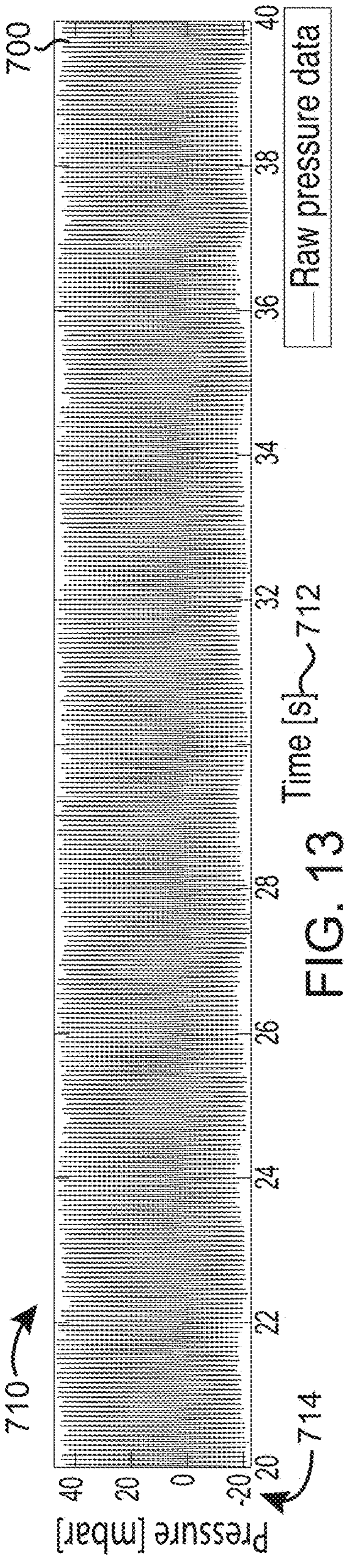
FIG. 13 is a graph of a pressure waveform generated by the system shown in FIG. 1.
Figure 14:
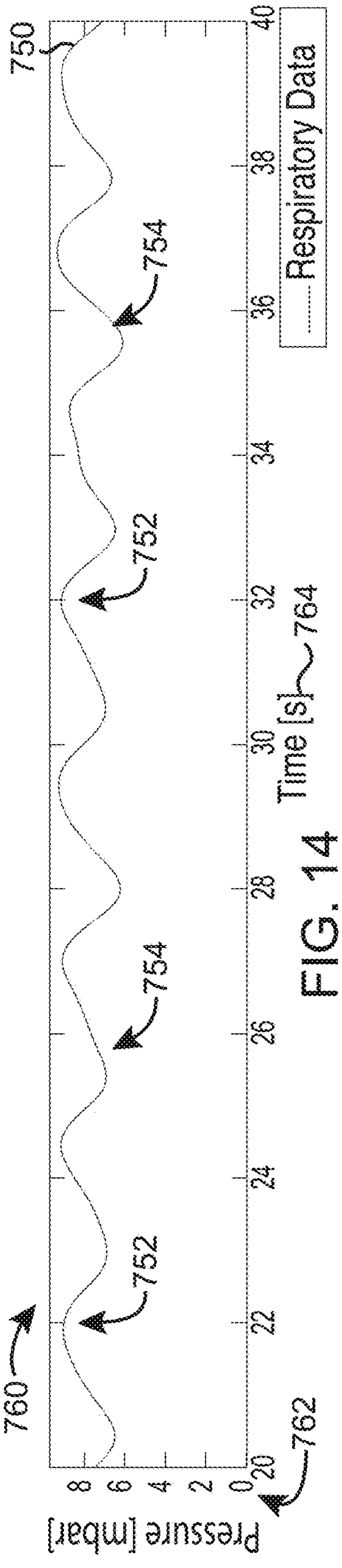
FIG. 14 is a graph of respiratory data derived from the pressure waveform shown in FIG. 13.
Figure 15:
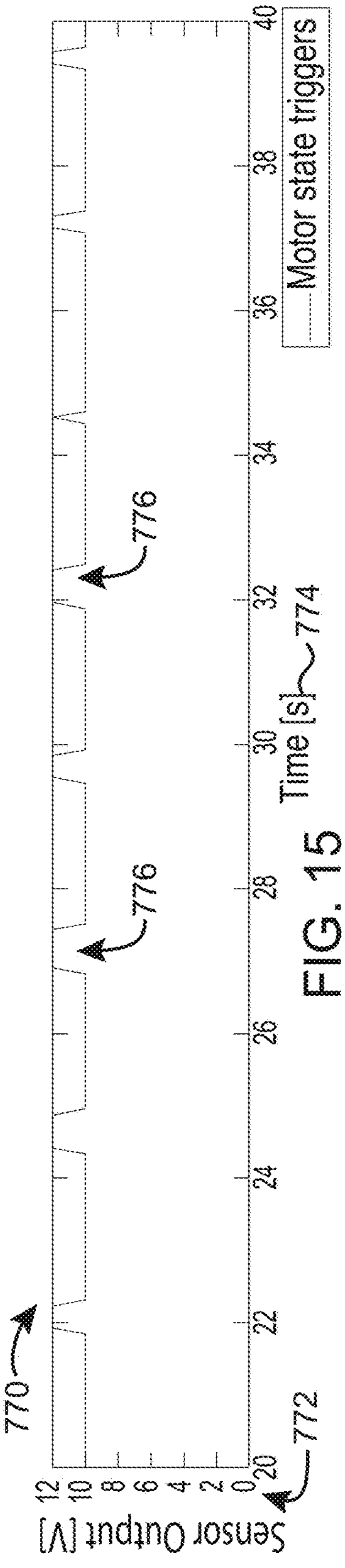
FIG. 15 is a graph of motor operation based on the respiratory data shown in FIG. 14.

The pressure sensor 206 can be used to generate the pressure waveform 700 shown on the graph 710 in FIG. 13. The graph 710 includes time 712 in seconds on the x-axis and pressure 714 in mbar on the y-axis. The pressure waveform 700 represents the pressure in the fluid chamber 220 over time. By filtering the pressure waveform 700, respiratory data 750 as shown in the graph 760 in FIG. 14 can be derived by the control circuitry 200. In some embodiments, the pressure waveform 700 is filtered using a low pass filter. The respiratory data 750 illustrates patient respiratory pressure variation 762 in mbar on the y-axis over time 764 in seconds on the x-axis. The respiratory data 750 can be used to determine when the patient inhales at points 752 where increased airflow is detected and when the patient exhales at points 754 where decreased airflow is detected. FIG. 15 is a graph 770 of motor operation based on the respiratory data 750 shown in FIG. 14. The graph 770 illustrates power an operation state signal 772 of the motor 224 in volts on the y-axis over time 774 in seconds on the x-axis. In particular, the graph 770 illustrates a method of operating the system 12 with the control circuitry 200 to assist the patient in breathing. That is, the motor 224 is controlled by the control circuitry 200 to alter a flow of the pressurized fluid from the fluid chamber 220 to the pressurizable chamber based on the respiratory data 750. In the illustrated embodiment, a low state of the motor 224 is activated at point 776 when the patient inhales.

Figure 16:
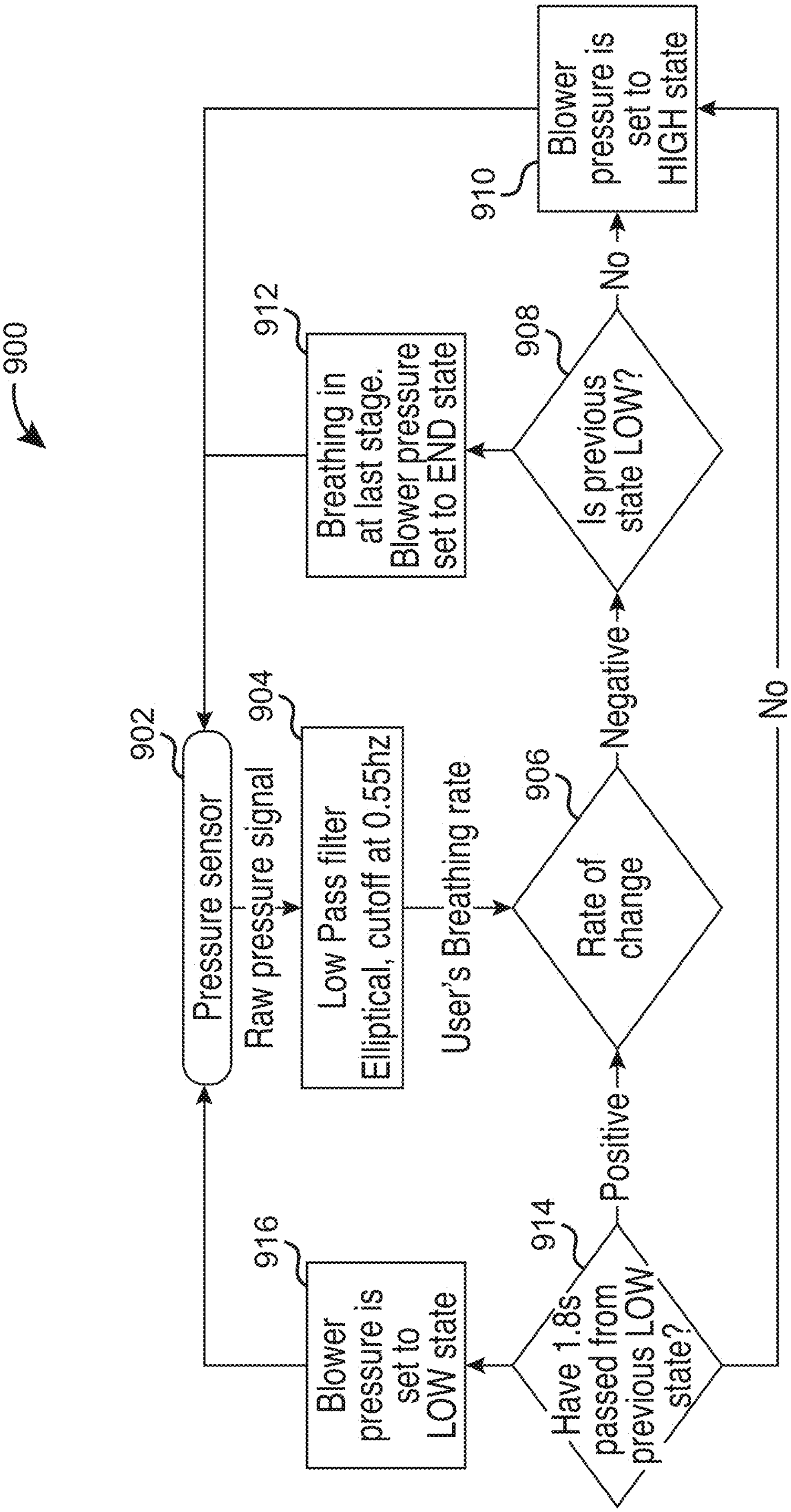
FIG. 16 is a graph of respiratory data overlaid on a graph of motor operation.

Referring to FIG. 16, a flowchart 900 illustrates a method of operating the system 12 to control the motor 224. At block 902, the pressure sensor 206 acquires a raw pressure signal (for example pressure waveform 700). At block 904 the raw pressure signal is filtered. In some embodiments, the raw pressure signal is filtered with a low pass filter. In some embodiments, the raw pressure signal is filtered with an elliptical filter having a cutoff at 0.55 Hz. The raw pressure signal is filtered to obtain a user's (patient's) breathing rate. The control circuitry 200 can wait a predetermined period, for example 10 seconds, for filter signal stability before proceeding to the next block 906. At decision block 906, the control circuitry 200 determines a rate of change in the user's breathing rate. That is, the filtered signal is differentiated to determine a direction of airflow.

If the rate of change is negative, the control circuitry 200 determines, at block 908, if the previous motor state is set to low. If the previous motor state is not set to low, the control circuitry 200 determines that the motor 224 is set to a high state, at block 910, and then continues to obtain the raw pressure signal, at block 902. If the previous motor state is set to low, the control circuitry determines that the user's breathing is at a last stage and the control circuitry 200 set the motor 224 to end the low state, at block 912. The method then returns to obtaining the raw pressure signal, at block 902.

If the rate of change, at block 906, is positive, the control circuitry 200, at block 914, determines whether a predetermined period of time has passed since the last low state. In some embodiments, the predetermined period of time can be 1.8 seconds. If the predetermined period of time has not passed, the control circuitry 200 determines that the motor 224 is set to a high state, at block 910, and then continues to obtain the raw pressure signal, at block 902. If the predetermined period of time has passed, the control circuitry 200 sets the motor 224 to the low state, at block 916, and then continues to obtain the raw pressure signal, at block 902.

Figure 17:
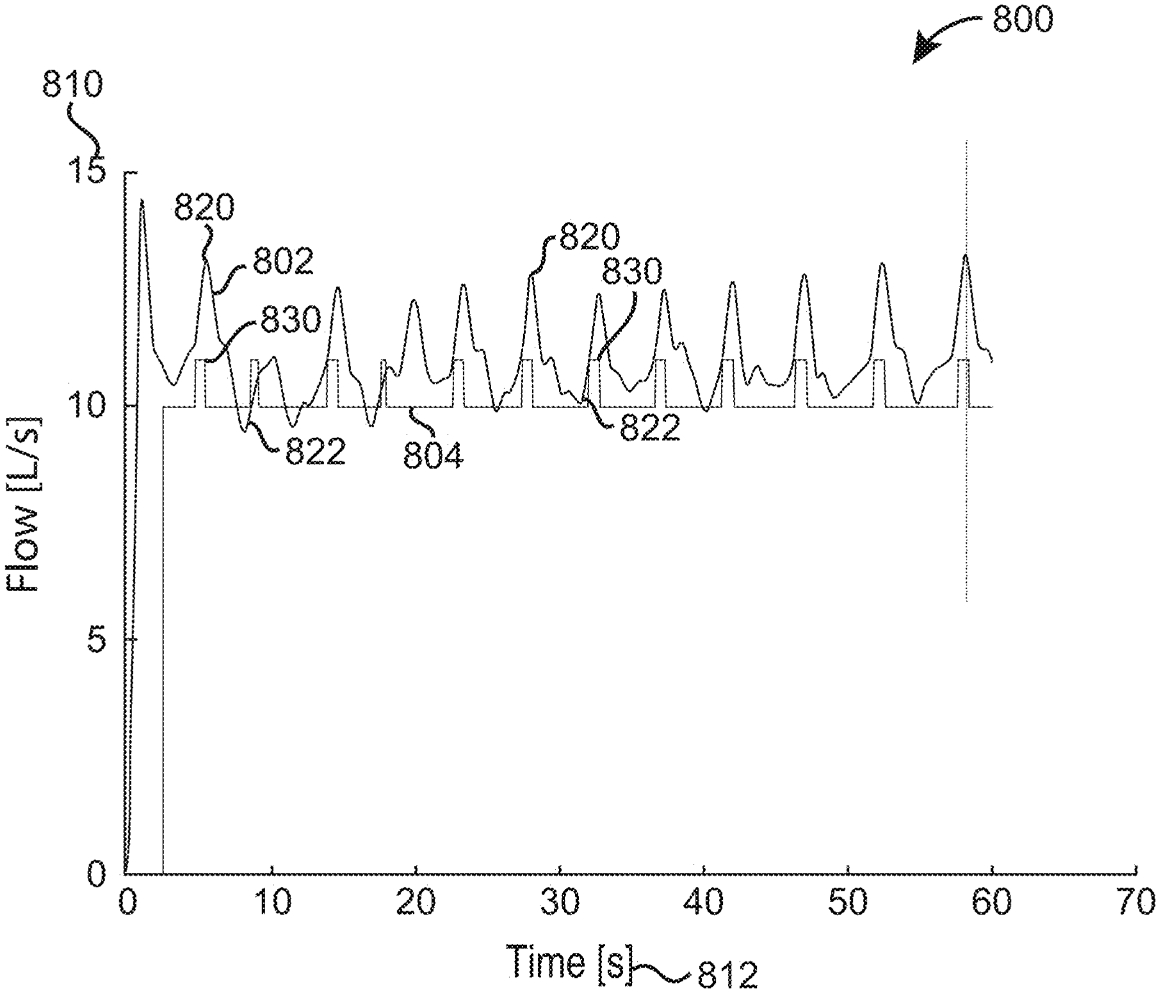
FIG. 17 is a flowchart of a method of operating the system shown in FIG. 1 to control the motor.

FIG. 17 illustrates a graph 800 of an airflow signal 802 from the patient overlaid on a signal 804 indicative of motor operation, when the method 900 is in use. The graph 800 illustrates airflow 810 in L/s on the y-axis over time 812 in seconds on the x-axis. The pattern of the signal 802 can be divided into inhalation segments 820 indicative of inhalation by the patient and exhalation segments 822 indicative of exhalation of the patient. The motor 224 is altered to decrease the flow of the pressurized fluid from the fluid chamber 220 to the pressurizable chamber when the patient inhales. That is, the motor 224 is operated at a low state when the patient inhales. The signal 804 illustrates when the low state is triggered at spikes 830. The motor 224 is altered to increase the flow of the pressurized fluid from the fluid chamber 220 to the pressurizable chamber when the patient exhales. That is, the motor 224 is operated at a high state when the patient exhales. The force of the high frequency pressure oscillation to the patient's chest wall includes a compressive force and an opposite expansive force. The compressive force is synchronized with an exhalation by the patient. The expansive force is synchronized with an inhalation by the patient.

Figure 18:
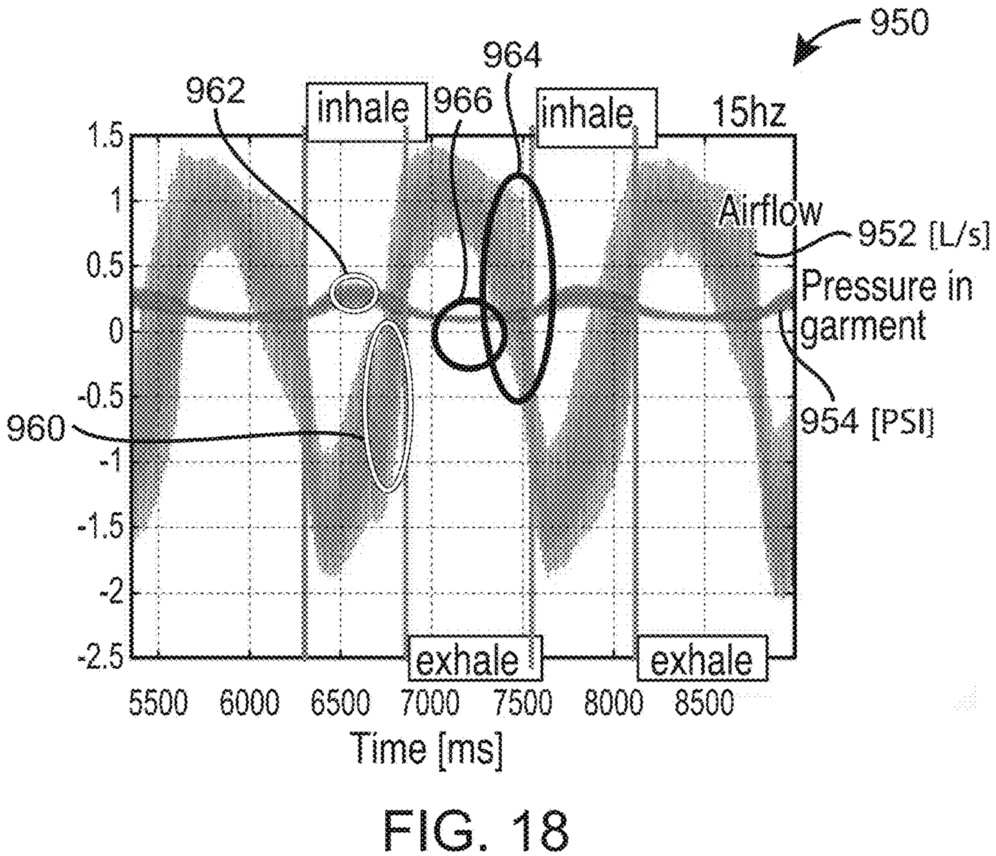
FIG. 18 is a graph of airflow from the patient compared a pressure of the garment when the motor is not controlled using the method shown in the flowchart of FIG. 17.
Figure 19:
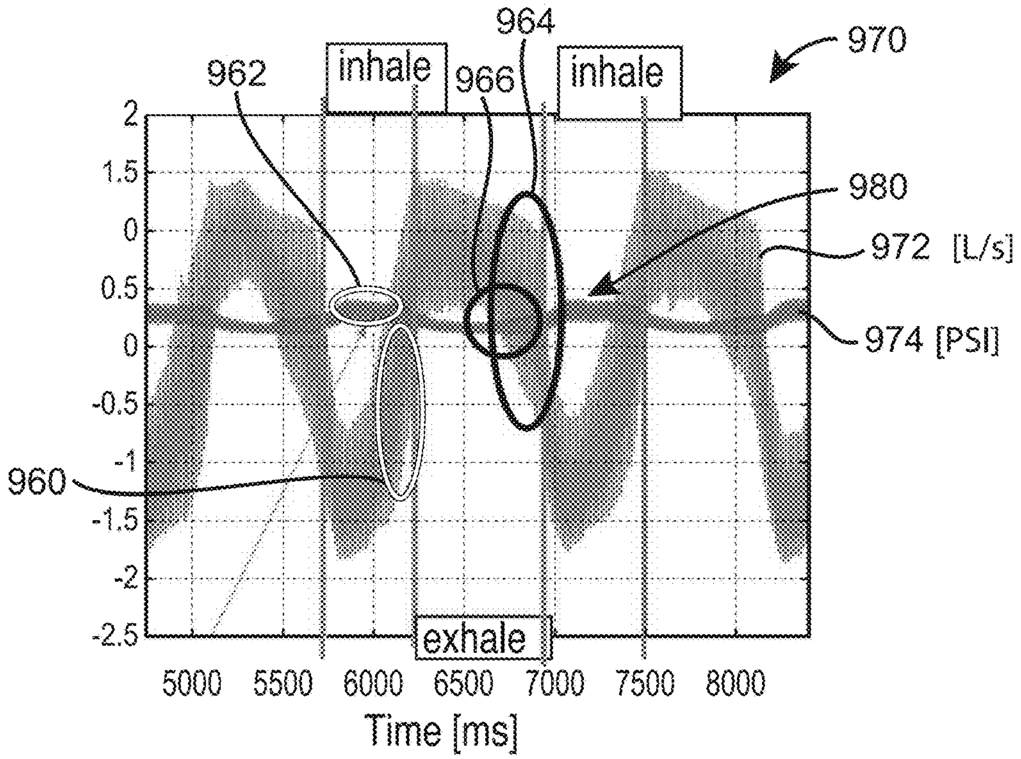
FIG. 19 is a graph of airflow from the patient compared a pressure of the garment when the motor is controlled using the method shown in the flowchart of FIG. 17.

FIG. 18 is a graph 950 of an airflow signal 952 in L/s from the patient compared a pressure signal 954 in PSI of the garment when the motor 224 is not controlled using the method shown in the flowchart 900. FIG. 19 is a graph 970 of an airflow signal 972 in L/s from the patient compared a pressure signal 974 in PSI of the garment when the motor 224 is controlled using the method shown in the flowchart 900. Each graph 950 and 970 illustrates an end of inhale 960 on the respective airflow signal 952, 972 and an end of inhale 962 on the respective pressure signal 954, 974. Each graph 950 and 970 also illustrates an end of exhale 964 on the respective airflow signal 952, 972 and an end of exhale 966 on the respective pressure signal 954, 974. The method described above results in the pressure in garment being modified in real time so that a peak pressure is shaved off in the user's respiratory pattern, as shown at point 980 in the pressure signal 974.

Incorporating a patient's respiratory feedback information to enable control of the system 12 facilitates achieving optimal therapy. That is, the addition of chest wall compression during exhalation can result in higher peak expiratory flow and a greater difference between mean expiratory flow and mean inspiratory flow, thereby facilitating better effectiveness of therapy. Additionally, during inhalation, the system 12 gives rise to poor user comfort as pressure on the user's ribcage prevents users from taking deeper breaths. The garment pressure is relaxed with inhalation for patient's comfort to breathe.

Any theory, mechanism of operation, proof, or finding stated herein is meant to further enhance understanding of principles of the present disclosure and is not intended to make the present disclosure in any way dependent upon such theory, mechanism of operation, illustrative embodiment, proof, or finding. It should be understood that while the use of the word preferable, preferably or preferred in the description above indicates that the feature so described can be more desirable, it nonetheless cannot be necessary and embodiments lacking the same can be contemplated as within the scope of the disclosure, that scope being defined by the claims that follow.

In reading the claims it is intended that when words such as "a," "an," "at least one," "at least a portion" are used there is no intention to limit the claim to only one item unless specifically stated to the contrary in the claim. When the language "at least a portion" and/or "a portion" is used, the item can include a portion and/or the entire item unless specifically stated to the contrary.

It should be understood that only selected embodiments have been shown and described and that all possible alternatives, modifications, aspects, combinations, principles, variations, and equivalents that come within the spirit of the disclosure as defined herein or by any of the following claims are desired to be protected. While embodiments of the disclosure have been illustrated and described in detail in the drawings and foregoing description, the same are to be considered as illustrative and not intended to be exhaustive or to limit the disclosure to the precise forms disclosed. Additional alternatives, modifications and variations can be apparent to those skilled in the art. Also, while multiple inventive aspects and principles have been presented, they need not be utilized in combination, and many combinations of aspects and principles are possible in light of the various embodiments provided above.

The invention claimed is:

1. A high frequency chest wall oscillation therapy system, comprising:
- an air pulse generator including:
  - control circuitry,
  - a fluid chamber carrying a fluid,
  - a motor configured to generate compression and expansion of the fluid in the fluid chamber to generate pressurized fluid, and
  - a pressure sensor coupled to the control circuitry to detect a pressure of the pressurized fluid in the fluid chamber, wherein the control circuitry generates a pressure waveform of the pressurized fluid based on the pressure detected, and
- a garment for dressing on a patient's torso, the garment including at least one fluid bladder defining a pressurizable chamber adapted to receive the pressurized fluid from the fluid chamber to provide a force of high frequency pressure oscillation to the patient's chest wall,
- wherein the pressure sensor includes:
  - a tube extending from the pressure sensor to a first port positioned in the fluid chamber to detect the pressure of the pressurized fluid in the fluid chamber, and
  - a second port positioned outside of the fluid chamber to detect an atmospheric pressure, and
- wherein the detected pressure of the pressurized fluid in the fluid chamber is compared to the detected atmospheric pressure to generate the pressure waveform.

2. The system of claim 1, wherein:
- the fluid chamber is defined between two reciprocating members that are moved toward and away from each other by the motor, and
- the pressure is detected by the pressure sensor between the reciprocating members.

3. The system of claim 2, wherein the reciprocating members include pistons.

4. The system of claim 2, wherein the reciprocating members include diaphragms.

5. A high frequency chest wall oscillation therapy system, comprising:
- an air pulse generator including:
  - control circuitry,
  - a fluid chamber carrying a fluid,
  - a motor configured to generate compression and expansion of the fluid in the fluid chamber to generate pressurized fluid, and
  - a pressure sensor to detect a pressure of the pressurized fluid in the fluid chamber, wherein the control circuitry generates a pressure waveform of the pressurized fluid based on the pressure detected, and
- a garment for dressing on a patient's torso, the garment including at least one fluid bladder defining a pressurizable chamber adapted to receive the pressurized fluid from the fluid chamber to provide a force of high frequency pressure oscillation to the patient's chest wall,
- wherein:
  - the garment produces a unique pressure waveform, and
  - the pressure waveform generated by the control circuitry from the pressure detected is compared to the unique pressure waveform to identify the garment.

6. The system of claim 5, wherein the unique pressure waveform includes at least one of a unique minimum pressure and maximum pressure, a unique peak to peak pressure value, and a unique air pulse generator inflation pressure.

7. The system of claim 5, wherein the pressure waveform generated by the control circuitry from the pressure detected is compared to the unique pressure waveform to identify a size of the garment.

8. A high frequency chest wall oscillation therapy system, comprising:
- an air pulse generator including:
  - control circuitry,
  - a fluid chamber carrying a fluid,
  - a motor configured to generate compression and expansion of the fluid in the fluid chamber to generate pressurized fluid, and
  - a pressure sensor to detect a pressure of the pressurized fluid in the fluid chamber, wherein the control circuitry generates a pressure waveform of the pressurized fluid based on the pressure detected, and
- a garment for dressing on a patient's torso, the garment including at least one fluid bladder defining a pressurizable chamber adapted to receive the pressurized fluid from the fluid chamber to provide a force of high frequency pressure oscillation to the patient's chest wall,
- wherein the pressure waveform generated by the control circuitry is indicative of a breathing pattern of the patient.

9. The system of claim 8, wherein:
- the control circuitry stores breathing pattern data indicative of the breathing pattern of the patient in a memory of the air pulse generator, and
- a historical assessment of the breathing pattern data is indicative of the patient's lung health.

10. The system of claim 9, wherein the breathing pattern data is acquired without an electrical connection between the patient and the control circuitry.

11. A high frequency chest wall oscillation therapy system, comprising:
- an air pulse generator including:
  - control circuitry,
  - a fluid chamber carrying a fluid,
  - a motor configured to generate compression and expansion of the fluid in the fluid chamber to generate pressurized fluid, and
  - a pressure sensor to detect a pressure of the pressurized fluid in the fluid chamber, wherein the control circuitry generates a pressure waveform of the pressurized fluid based on the pressure detected, and
- a garment for dressing on a patient's torso, the garment including at least one fluid bladder defining a pressurizable chamber adapted to receive the pressurized fluid from the fluid chamber to provide a force of high frequency pressure oscillation to the patient's chest wall, wherein:

the control circuitry derives respiratory data based on the pressure waveform, and the motor is controlled by the control circuitry to alter a flow of the pressurized fluid from the fluid chamber to the pressurizable chamber based on the respiratory data.

12. The system of claim 11, wherein:

the pressure waveform is passed through a low pass filter to derive the respiratory data, the respiratory data is differentiated to acquire a signal indicative of airflow from the patient, and the signal indicative of airflow from the patient includes an inhalation segment indicative of inhalation by the patient and an exhalation segment indicative of exhalation of the patient.

13. The system of claim 11, wherein the motor is controlled to decrease the flow of the pressurized fluid from the fluid chamber to the pressurizable chamber when the patient inhales.

14. The system of claim 11, wherein the motor is controlled to increase the flow of the pressurized fluid from the fluid chamber to the pressurizable chamber when the patient exhales.

15. The system of claim 11, wherein the motor is operated at a low state when the patient inhales.

16. The system of claim 11, wherein the motor is operated at a high state when the patient exhales.

17. The system of claim 11, wherein the force of high frequency pressure oscillation to the patient's chest wall includes a compressive force and an opposite expansive force, wherein the compressive force is configured to be synchronized with an exhalation by the patient.

18. The system of claim 17, wherein the expansive force is configured to be synchronized with an inhalation by the patient.

* * * * *